(12) United States Patent
Miyake et al.

(10) Patent No.: US 12,528,138 B2
(45) Date of Patent: Jan. 20, 2026

(54) FRICTION STIR WELDING DEVICE AND MAINTENANCE METHOD FOR SAME

(71) Applicant: KAWASAKI JUKOGYO KABUSHIKI KAISHA, Kobe (JP)

(72) Inventors: Masahiro Miyake, Kobe (JP); Ryoji Ohashi, Kobe (JP); Shuhei Yoshikawa, Kobe (JP); Naoki Takeoka, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 18/846,835

(22) PCT Filed: Mar. 16, 2023

(86) PCT No.: PCT/JP2023/010477
§ 371 (c)(1),
(2) Date: Sep. 13, 2024

(87) PCT Pub. No.: WO2023/189689
PCT Pub. Date: Oct. 5, 2023

(65) Prior Publication Data
US 2025/0196253 A1     Jun. 19, 2025

(30) Foreign Application Priority Data

Apr. 1, 2022    (JP) ................................. 2022-062057

(51) Int. Cl.
*B23K 20/00*          (2006.01)
*B23K 20/12*          (2006.01)

(52) U.S. Cl.
CPC .......... *B23K 20/126* (2013.01); *B23K 20/125* (2013.01)

(58) Field of Classification Search
CPC .......................... B23K 20/1255; B23K 20/125; B23K 20/126; B23K 20/123; B23K 20/122; B23K 20/002
See application file for complete search history.

(56) References Cited

U.S. PATENT DOCUMENTS

| | | | |
|---|---|---|---|
| 10,953,489 B2 * | 3/2021 | Fröhlke | B23K 20/1245 |
| 11,179,799 B2 * | 11/2021 | Hirano | B23K 20/122 |
| 11,325,203 B2 * | 5/2022 | Weigl | B23K 20/123 |
| 11,396,060 B2 * | 7/2022 | Hirano | B23K 20/126 |
| 11,491,576 B2 * | 11/2022 | Haruna | B23K 20/1255 |
| 11,534,981 B2 * | 12/2022 | Okada | B29C 66/41 |
| 11,633,802 B2 * | 4/2023 | Okada | B23K 20/1245 228/112.1 |
| 11,858,060 B2 * | 1/2024 | Hatano | B23K 20/1245 |

(Continued)

FOREIGN PATENT DOCUMENTS

JP          4754256 B2     8/2011

*Primary Examiner* — Erin B Saad
(74) *Attorney, Agent, or Firm* — Oliff PLC

(57) ABSTRACT

A friction stir welding device includes: a pin extending along an axis; a shoulder having a cylindrical shape and coaxially surrounding an outer periphery of the pin; and a driver that allows the pin and the shoulder to rotate about the axis and to advance and retract along the axis individually. The shoulder includes a shoulder main body having a distal end to be plunged into a welding target, and a shoulder adapter having a fit hole in which a proximal end of the shoulder main body is shrink-fitted and connecting the shoulder main body and the driver to each other.

10 Claims, 18 Drawing Sheets

(56) References Cited

U.S. PATENT DOCUMENTS

| | | | | |
|---|---|---|---|---|
| 11,897,049 | B2* | 2/2024 | Chen | B23K 20/1245 |
| 11,911,841 | B2* | 2/2024 | Miyake | B23K 20/125 |
| 11,938,559 | B2* | 3/2024 | Ouchi | B23K 20/126 |
| 11,969,818 | B1* | 4/2024 | Wang | B23K 20/1255 |
| 12,145,211 | B2* | 11/2024 | Seo | B23K 20/1255 |
| 12,202,066 | B2* | 1/2025 | Muramatsu | B23K 20/1265 |
| 12,208,464 | B2* | 1/2025 | Figner | B23K 20/123 |
| 12,280,442 | B2* | 4/2025 | Seo | B23K 20/123 |
| 12,303,995 | B2* | 5/2025 | Takeoka | B23K 20/1265 |
| 12,365,046 | B2* | 7/2025 | Konno | B23K 20/125 |
| 12,383,975 | B2* | 8/2025 | Song | B23K 20/128 |
| 2006/0102699 | A1 | 5/2006 | Burton | B23K 20/123 228/2.1 |
| 2007/0152015 | A1* | 7/2007 | Burton | B23K 20/1265 228/2.1 |
| 2008/0006677 | A1 | 1/2008 | Kumagai et al. | |
| 2013/0239397 | A1* | 9/2013 | Hotte | B21K 25/005 29/525 |
| 2014/0069985 | A1* | 3/2014 | Okada | B23K 20/1245 228/2.1 |
| 2015/0183054 | A1* | 7/2015 | Okada | B23K 20/1255 228/2.1 |
| 2017/0304935 | A1* | 10/2017 | Okada | B23K 20/22 |
| 2017/0341176 | A1* | 11/2017 | Okada | B23K 20/125 |
| 2018/0257169 | A1* | 9/2018 | Okada | B23K 20/129 |
| 2019/0070692 | A1* | 3/2019 | Haruna | B23K 20/123 |
| 2019/0262935 | A1* | 8/2019 | Fröhlke | B23K 20/122 |
| 2020/0282491 | A1* | 9/2020 | Haruna | B23K 20/1265 |
| 2020/0353559 | A1* | 11/2020 | Weigl | B23K 20/1245 |
| 2021/0023649 | A1* | 1/2021 | Muramatsu | B23K 20/126 |
| 2021/0086291 | A1* | 3/2021 | Okada | B23K 20/125 |
| 2022/0143739 | A1* | 5/2022 | Hatano | B23K 20/1255 |
| 2022/0339734 | A1* | 10/2022 | Miyake | B23K 20/125 |
| 2023/0096628 | A1* | 3/2023 | Figner | B23K 20/1255 228/112.1 |
| 2023/0191710 | A1* | 6/2023 | Hatano | B29C 65/0681 264/68 |
| 2023/0249281 | A1* | 8/2023 | Konno | B23K 20/123 228/112.1 |
| 2023/0390860 | A1* | 12/2023 | Takeoka | B23K 20/227 |
| 2024/0293889 | A1* | 9/2024 | Miyake | B23K 20/125 |
| 2025/0144740 | A1* | 5/2025 | Takeoka | B23K 20/1265 |
| 2025/0196253 | A1* | 6/2025 | Miyake | B23K 20/125 |
| 2025/0249531 | A1* | 8/2025 | Takeoka | B23K 20/233 |

* cited by examiner

FRICTION STIR WELDING DEVICE AND MAINTENANCE METHOD FOR SAME

TECHNICAL FIELD

The present disclosure relates to a friction stir welding device including a pin main body and a shoulder main body.

BACKGROUND ART

Manufacturing a structure, such as an aircraft, a railway vehicle, or an automobile, may require an operation of welding two or more members made of metal, resin, or other material in an overlapping or stacking manner. As one of ways of the welding, friction stir welding is known. The friction stir welding represents a way of plunging a rotating tool into a workpiece or a welding target to generate a plastic flow, and welding the workpiece.

Patent Literature 1 discloses a friction stir welding device as an example device to perform the friction stir welding. The friction stir welding device includes a rotary tool including: a pin or a probe that is rotatable about an axis and is advanceable and retractable along the axis; and a shoulder or a shoulder member that is located outside the pin, is rotatable about the axis, and is advanceable and retractable along the axis. Each of the pin and the shoulder is rotatably driven to be plunged into the workpiece and generate a plastic flow in the plunged portion.

In Patent Literature 1, the shoulder integrally has: a shoulder distal end having a small diameter, a small thinness, and a cylindrical shape; and a shoulder proximal end having a large diameter, a large thickness, and a cylindrical shape. The shoulder distal end is directly plunged into the welding target, and the shoulder proximal end connects a driver that generates a rotational force and the shoulder distal end to each other.

Here, the shoulder distal end to be directly plunged into the welding target is required to have high stiffness from the perspective of abrasion resistance. In contrast, the shoulder proximal end is not required to have such high stiffness as that of the shoulder distal end. Considering that the shoulder proximal end and the shoulder distal end in Patent Literature 1 are integrated, however, the shoulder proximal end and the shoulder distal end are rationally made of same metal material. In this respect, the entire shoulder including the shoulder distal end and the shoulder proximal end is made of expensive material (e.g., cemented carbide) having sufficiently high hardness. The unit price for the shoulder is hence likely to be costly.

Besides, the shoulder distal end may have a defect, such as a crack, in gradual abrasion of the shoulder attributed to continuous use thereof. In this case, the shoulder distal end needs to be renewed. Unfortunately, the configuration in Patent Literature 1 needs replacement of the entire shoulder including the shoulder distal end and the shoulder proximal end, and thus, the replacement costs a lot.

CITATION LIST

Patent Literature

Patent Literature 1: Japanese Patent Publication No. 4754256

SUMMARY OF INVENTION

The present disclosure has been achieved in consideration of the circumstances described above, and has an object of providing a friction stir welding device including a shoulder which is available at a low cost and easily maintainable, and further providing a method for facilitated maintenance for the shoulder.

To overcome the aforementioned drawbacks, a friction stir welding device according to one aspect of the present disclosure includes: a pin extending along an axis; a shoulder having a cylindrical shape and coaxially surrounding an outer periphery of the pin; a driver that allows the pin and the shoulder to rotate about the axis and to advance and retract along the axis individually. The shoulder includes a shoulder main body having a distal end to be plunged into a welding target, and a shoulder adapter having a fit hole in which a proximal end of the shoulder main body is shrink-fitted and connecting the shoulder main body and the driver to each other.

A maintenance method for a friction stir welding device according to another aspect of the present disclosure is a maintenance method for replacement of the shoulder main body in the friction stir welding device described above. The maintenance method includes: heating the shoulder adapter to increase a diameter of the fit hole of the shoulder adapter and detaching the shoulder adapter from the shoulder main body; inserting a proximal end of a new shoulder main body in the fit hole of the heated shoulder adapter; and cooling the shoulder adapter to decrease the increased diameter of the fit hole of the shoulder adapter and fixedly attaching the new shoulder main body to the shoulder adapter.

DESCRIPTION OF EMBODIMENTS

Hereinafter, embodiments of the present disclosure will be described with reference to the accompanying drawings. A friction stir welding device according to the present disclosure is applicable to manufacture of various welded assemblies each attainable by stacking and spot-welding two or more structural members made of metal or resin, such as plates, frames, exterior members, or columnar members. Such a manufactured welded assembly can serve as a constituent component of a structure, for example, an aircraft, a railway vehicle, or an automobile.

(1) First Embodiment

Friction Stir Welding Device

Figure 1:
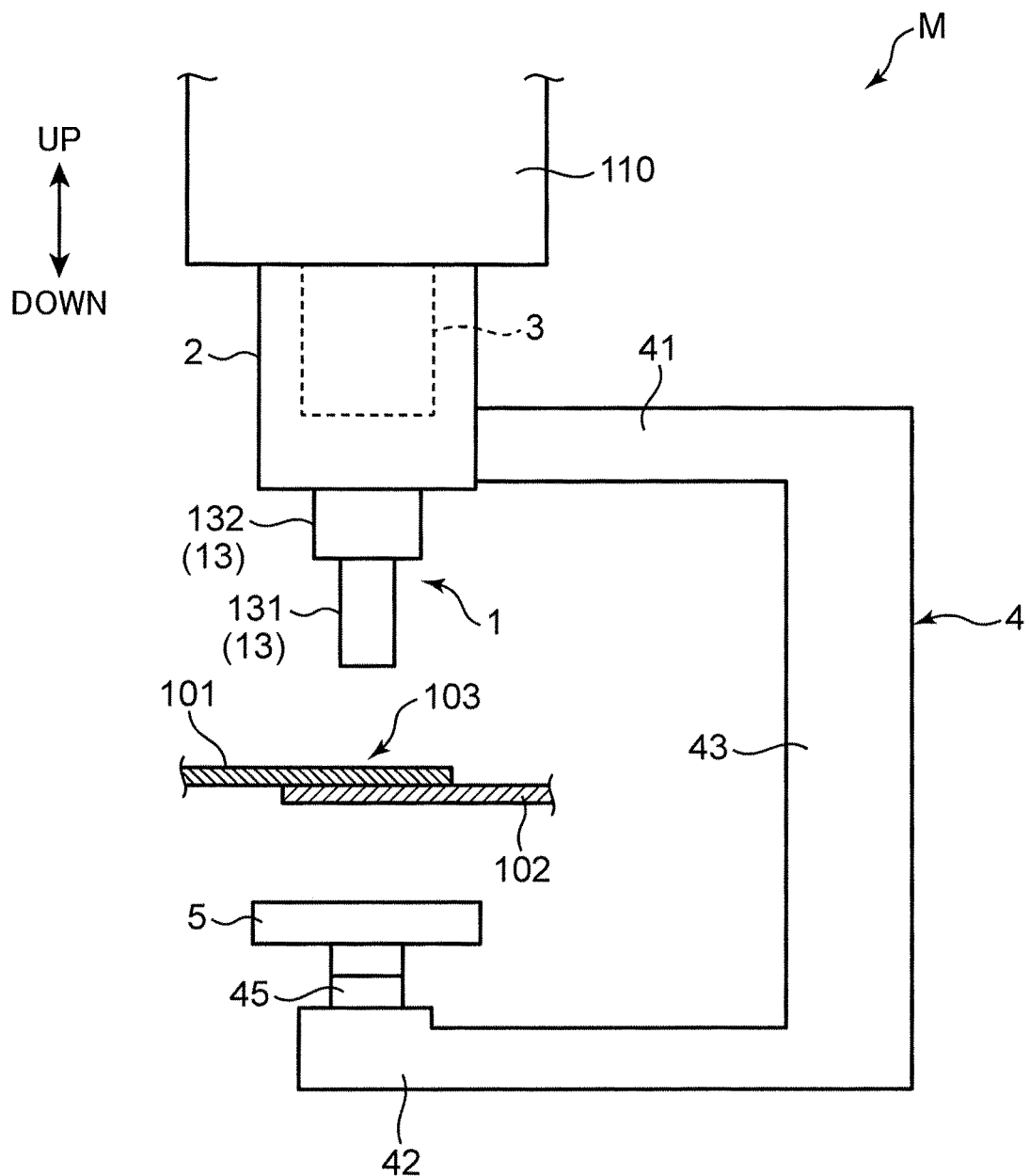
FIG. 1 is a front view of a configuration of a friction stir welding device according to a first embodiment of the present disclosure.
Figure 2:
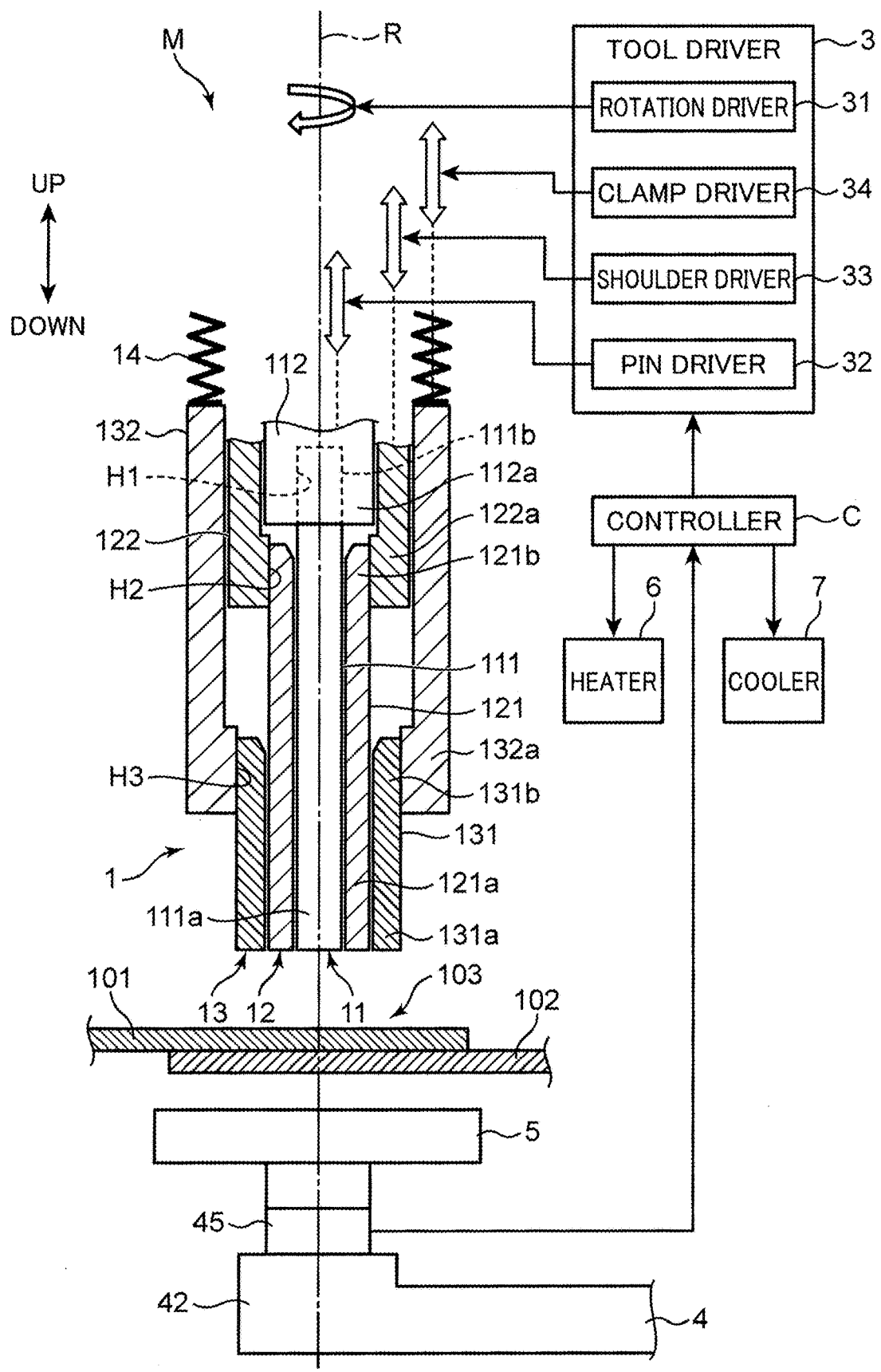
FIG. 2 is a schematic view of a system configuration of the friction stir welding device.

FIG. 1 is a front view of a configuration of a friction stir welding device M according to a first embodiment of the present disclosure. FIG. 2 is a schematic view of a system configuration of the friction stir welding device M. As illustrated in the drawings, the friction stir welding device M includes: a rotary tool 1 of a double-acting type; a base 2 that supports the rotary tool 1; a tool driver 3 (driver) that drives to rotate, raise, and lower the rotary tool 1; a C-shaped frame 4 fixed to the base 2; a backing 5 fixed to the C-shaped frame 4; a heater 6 that heats the rotary tool 1; a cooler 7 that cools the rotary tool 1; and a controller C that controls an operation of each of the tool driver 3, the heater 6, and the cooler 7. Although FIG. 1 and FIG. 2 show directions "up" and "down", the directions are for convenience of description and are not intended to limit a use posture of the rotary tool 1.

The rotary tool 1 protrudes downward from the base 2, and is supported in a rotatable, raisable, and lowerable manner with respect to the base 2. The rotary tool 1 faces the backing 5 from above. A target to be friction stir welded, that is, a welding target, is arranged between the rotary tool 1 and the backing 5. In the embodiment, the welding target includes an overlapping part 103 where a first member 101 and a second member 102 each having a plate shape overlap each other in a thickness direction.

As shown in FIG. 2, the rotary tool 1 includes a pin 11, a shoulder 12, and a clamp 13.

The pin 11 is a member having a rod shape or a columnar shape with its axis extending in the up-down direction. The pin 11 is rotatable about the axis as a rotation axis R, and advanceable and retractable to shift downward and upward in the up-down direction along the rotation axis R.

The shoulder 12 surrounds an outer periphery of the pin 11. Specifically, the shoulder 12 is a cylindrical member having a hollow in which the pin 11 is inserted. The shoulder 12 has an axis that is coaxial with the axis or the rotation axis R of the pin 11. The shoulder 12 is rotatable about the rotation axis R of the pin 11, and advanceable and retractable to shift downward and upward in the up-down direction along the rotation axis R.

The rotary tool 1 in the embodiment is a double-acting tool including the pin 11 and the shoulder 12 that are independently shiftable in an axial direction. Specifically, the shoulder 12 and the pin 11 being in the shoulder 12 are shiftable relative to each other in the up-down direction along the rotation axis R while rotating about the rotation axis R. In other words, the pin 11 and the shoulder 12 are not only simultaneously shiftable upward and downward along the rotation axis R, but also are independently shiftable such that one shifts downward and the other shifts upward.

The clamp 13 surrounds an outer periphery of the shoulder 12. Specifically, the clamp 13 is a cylindrical member having a hollow in which the shoulder 12 is inserted. The clamp 13 has an axis that is also coaxial with the rotation axis R. The clamp 13 does not rotate about the axis, but is advanceable and retractable to shift downward and upward in the up-down direction along the rotation axis R. The clamp 13 serves to surround the outer periphery of each of the pin 11 and the shoulder 12 when the pin or the shoulder performs friction stir. The clamp 13 surrounding the outer periphery allows a friction-stirred part to be finished smoothly without scattering friction stir materials.

The clamp 13 has an upper end to which a spring 14 is attached. The spring 14 urges the clamp 13 downward, that is, toward the welding target or the overlapping part 103. The clamp 13 is attached to the base 2 via the spring 14 interposed therebetween.

As illustrated in FIG. 1, the base 2 is a housing that accommodates the tool driver 3, and supports the rotary tool 1 in a rotatable, raisable, and lowerable manner via the tool driver 3. The base 2 is fixed to a mobile body 110 that is movable with respect to the welding target. The mobile body 110 may be, for example, an arm distal end of an articulated robot. The mobile body 110 can move the rotary tool 1 toward the overlapping part 103 being the welding target and move the rotary tool 1 away from the overlapping part 103.

The C-shaped frame 4 includes a proximal end 41 fixed to a side surface of the base 2, a distal end 42 that supports the backing 5 from below, and a connection part 43 that connects the proximal end 41 and the distal end 42 to each other. The C-shaped frame 4 has such a substantially C-shape that the distal end 42 is located below the rotary tool 1 in a front view.

The backing 5 is a plate member fixed to the distal end 42 of the C-shaped frame 4 to lie below the rotary tool 1. The backing 5 has a flat upper surface to come into contact with a lower surface of the overlapping part 103 being the welding target. Specifically, the backing 5 is a support member that supports the overlapping part 103 from below when the pin 11 or the shoulder 12 of the rotary tool 1 is plunged into the overlapping part 103 for welding. The clamp 13 urged downward by the spring 14 and the backing 5 sandwich the overlapping part 103 to hold the overlapping part 103 in welding by the rotary tool 1.

A loadcell 45 is arranged between the distal end 42 of the C-shaped frame 4 and the backing 5. The loadcell 45 measures a load acting on the backing 5. A result of the measurement of the load by the loadcell 45 is input into the controller C (FIG. 2) as an electric signal.

As shown in FIG. 2, the tool driver 3 includes a rotation driver 31, a pin driver 32, a shoulder driver 33, and a clamp driver 34. The rotation driver 31 is a mechanism that rotates the pin 11 and the shoulder 12 about the rotation axis R. The pin driver 32 is a mechanism that allows the pin 11 to advance and retract along the rotation axis R, and allows the pin 11 to be plunged into and retracted from the overlapping part 103. The shoulder driver 33 is a mechanism that allows the shoulder 12 to advance and retract along the rotation axis R, and allows the shoulder 12 to be plunged into and retracted from the overlapping part 103. The clamp driver 34 is a mechanism that allows the clamp 13 to advance and retract along the rotation axis R, and allows the clamp 13 to be pressed against the overlapping part 103. At this time, an urging force of the spring 14 acts. Each of the drivers 31 to 34 can include a motor, a drive gear, and other component.

Figure 8:
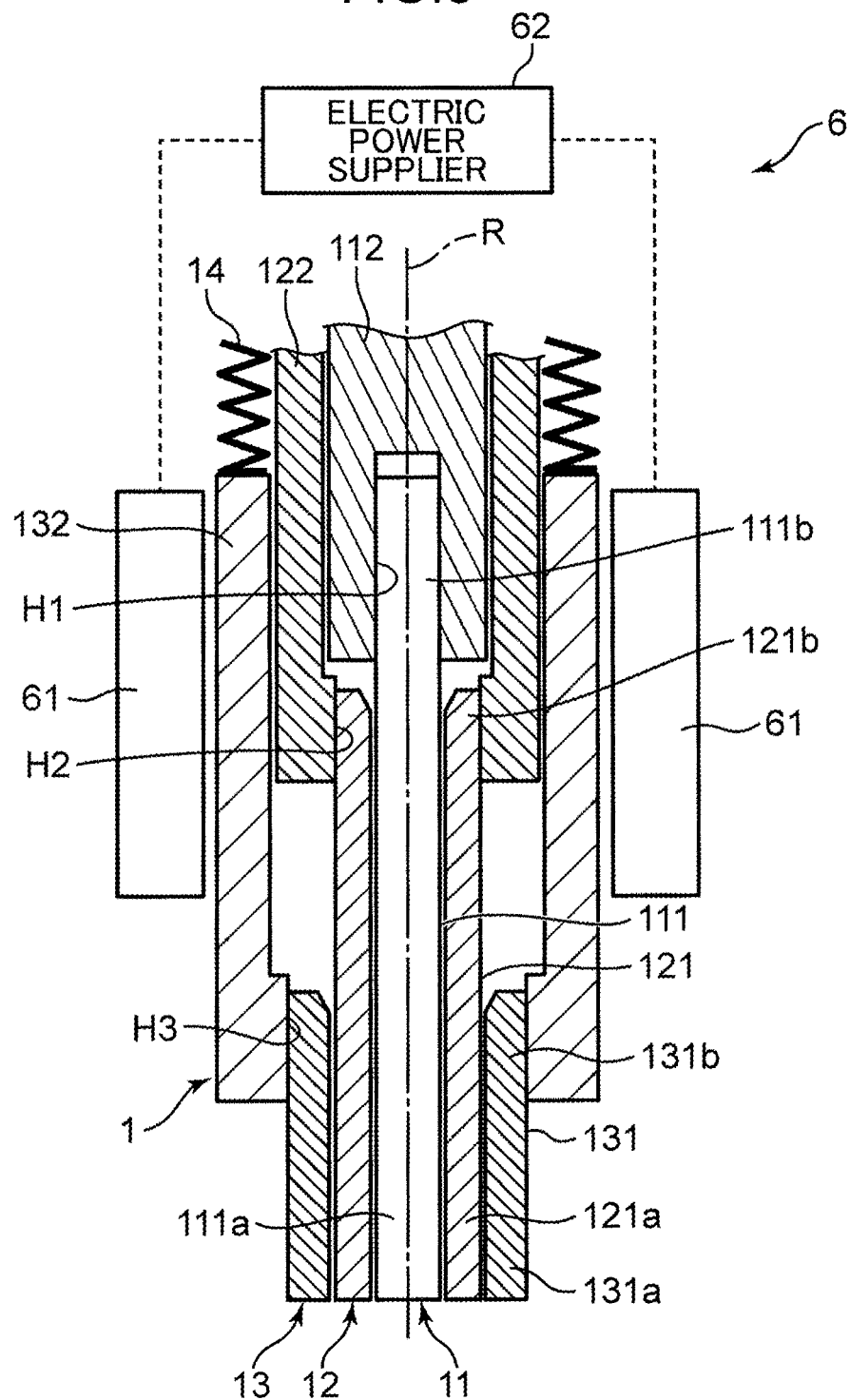
FIG. 8 is a schematic view of a configuration of a heater that heats the rotary tool.

The heater 6 heats the rotary tool 1 from outside in maintenance for the rotary tool 1. Specifically, as illustrated in FIG. 8, the heater 6 includes a heating element 61 having an annular shape and surrounding an outer periphery of the rotary tool 1, and an electric power supplier 62 that supplies electric power to the heating element 61. For example, the heating element 61 heats a target through electromagnetic induction. In this example, the heating element 61 heats the rotary tool 1 through electromagnetic induction based on the electric power supplied from the electric power supplier 62. It is noted that a heating way with the heating element 61 is not limited to the electromagnetic induction, and another appropriate heating way with, for example, warm air is applicable. The maintenance for the rotary tool 1 mentioned here means a work of replacement of any of a pin main body 111, a shoulder main body 121, and a clamp main body 131 to be described later.

Figure 11:
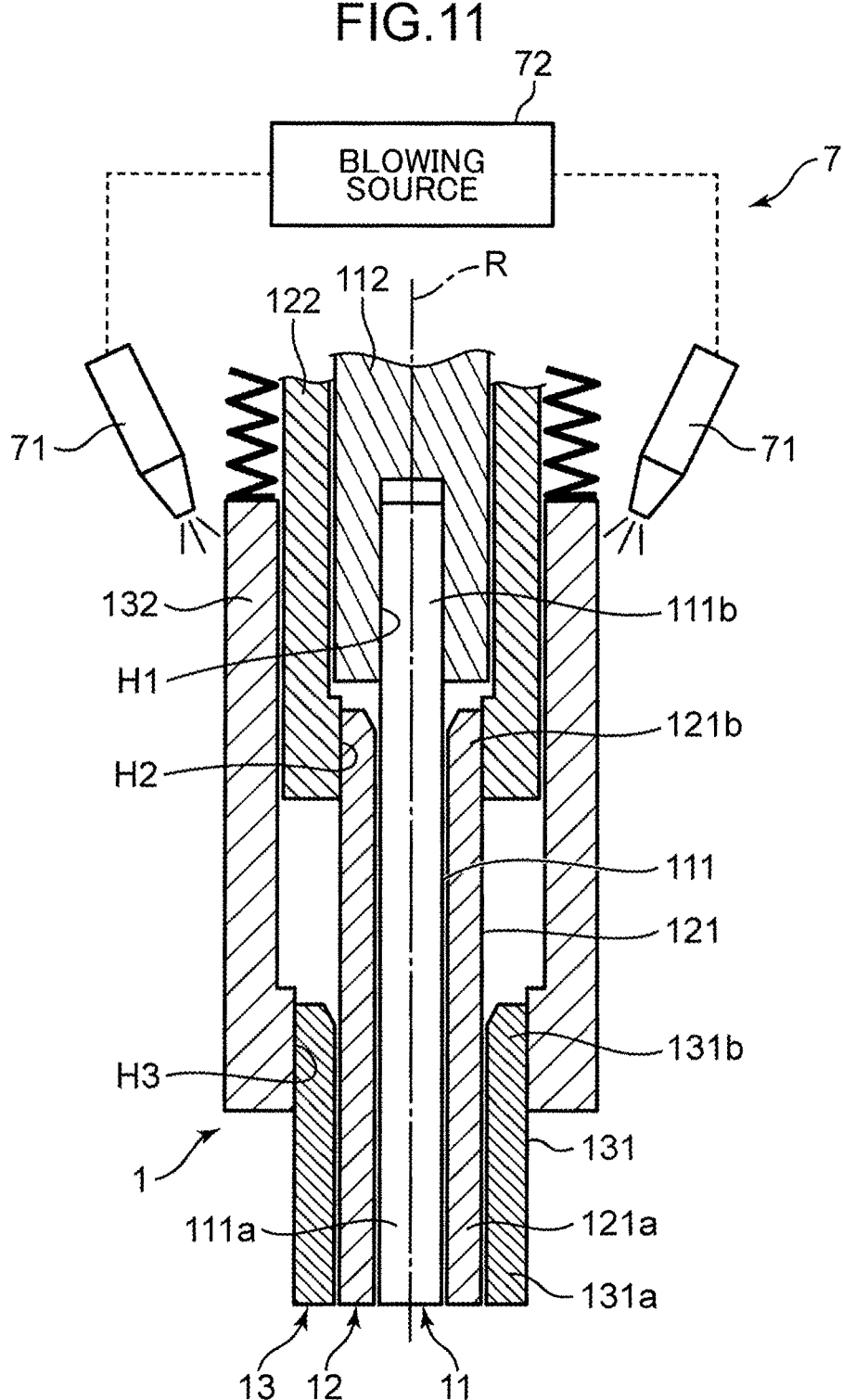
FIG. 11 is a schematic view of a configuration of a cooler that cools the rotary tool.

The cooler 7 cools the rotary tool 1 from outside in the maintenance for the rotary tool 1. Specifically, as illustrated in FIG. 11, the cooler 7 includes a plurality of nozzles 71 each facing the outer periphery of the rotary tool 1 from obliquely above and a blowing source 72 that sends air under pressure to the nozzles 71. The nozzles 71 cool the rotary tool 1 by blowing the air from the blowing source 72 to the rotary tool 1.

Here, the heater 6 and the cooler 7 may not always be provided at the friction stir welding device M, and may be temporarily prepared for the maintenance for the rotary tool 1. For example, a tool changer may be adopted for automatic maintenance. In this example, the friction stir welding device M may get access to the heater 6 and the cooler 7 prepared at the tool changer.

The controller C includes a microcomputer or the like, and controls an operation of each of the tool driver 3, the heater 6, and the cooler 7 by executing a predetermined control program. Specifically, the controller C controls the rotation driver 31 to cause the pin 11 and the shoulder 12 to perform required rotation operation. The controller C also controls the pin driver 32, the shoulder driver 33, and the clamp driver 34 to cause the pin 11, the shoulder 12, and the clamp 13, respectively, to perform required advancing and retracting operation. The controller C further controls the heater 6 and the cooler 7 to respectively heat and cool the rotary tool 1.

Example Operation in Friction Stir Welding

Welding ways utilizing the friction stir welding device M are mainly classified into a welding way adopting a shoulder-preceding process and a welding way adopting a pin-preceding process. The welding way adopting the shoulder-preceding process is a way of plunging the shoulder 12 of the rotary tool 1 into a welding target or the overlapping part 103 prior to the pin 11. The welding way adopting the pin-preceding process is a way of plunging the pin 11 of the rotary tool 1 into the welding target prior to the shoulder 12. In the embodiment, the shoulder-preceding process is selected from these processes.

Figure 3:
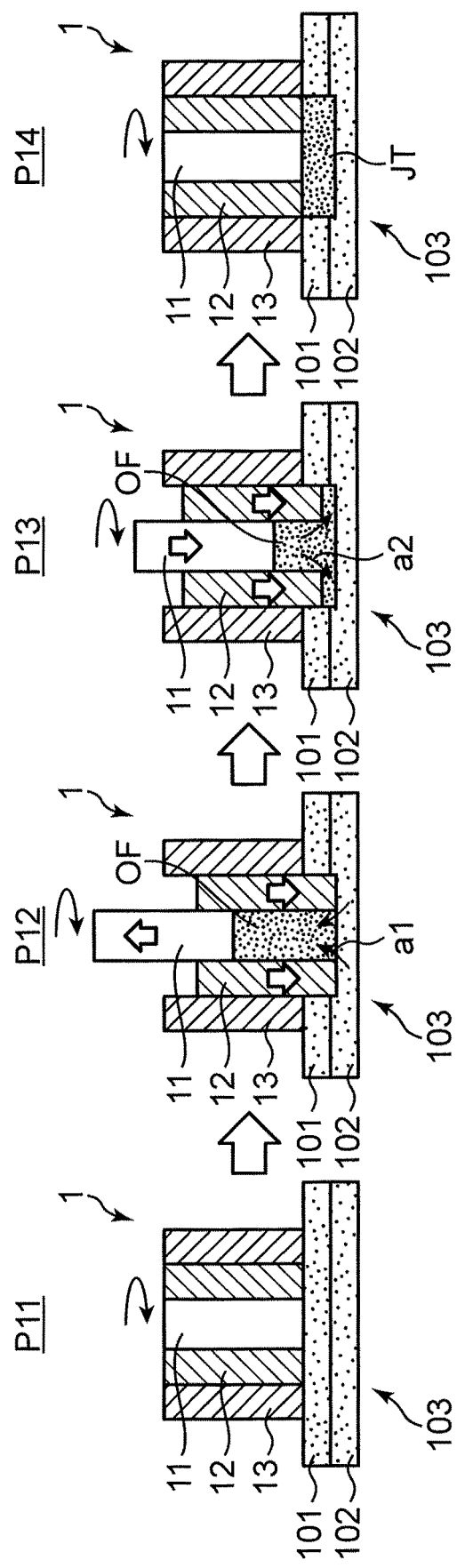
FIG. 3 is a schematic view for explaining a welding way adopting a shoulder-preceding process with the friction stir welding device.

FIG. 3 is a schematic view illustrating states of friction stir welding the overlapping part 103 of the first and second members 101 and 102 that is the welding target through the shoulder-preceding process. The welding way adopting the shoulder-preceding process includes steps P11 to P14 which will be described below.

Step P11 illustrates a preheating step of the overlapping part 103. In the preheating step, the controller C causes the pin 11 and the shoulder 12 to rotate about the axis at a predetermined rotational speed in a state where a distal end or a lower end of the rotary tool 1 is in contact with a surface of the first member 101.

Step P12 illustrates a plunging step of the shoulder 12. In the plunging step, the controller C lowers the shoulder 12 to be plunged into the overlapping part 103 and raises the pin 11 to retract. This operation stirs a material in a plunging region of the shoulder 12. An overflow material OF overflowed from the overlapping part 103 by the plunging is released to a hollow space in the shoulder 12 coming into existence through the retraction of the pin 11 (see an arrow a1). As described above, in the embodiment, the pin 11 shifts upward relative to the shoulder 12 in the friction stir welding.

Step P13 illustrates a backfill step of the overflow material OF. In the backfill step, the controller C raises the shoulder 12 to retract from the overlapping part 103 and lowers the pin 11. When the pin 11 is lowered, the plunging region of the shoulder 12 is backfilled with the overflow material OF released to the hollow space as indicated by an arrow b2.

Step P14 illustrates a leveling step. In the leveling step, the controller C causes the pin 11 and the shoulder 12 to rotate with a distal end or a lower end of each of the pin and the shoulder restored to a height position of an upper surface of the first member 101. This operation levels an upper surface of the overlapping part 103 and smooths the upper surface to an extent of almost no protrusions and recesses.

Steps P11 to P14 described above result in forming a weld JT having a smooth upper surface, and spot welding the first member 101 and the second member 102 in the overlapping part 103.

Details of the Structure of the Rotary Tool

Figure 4:
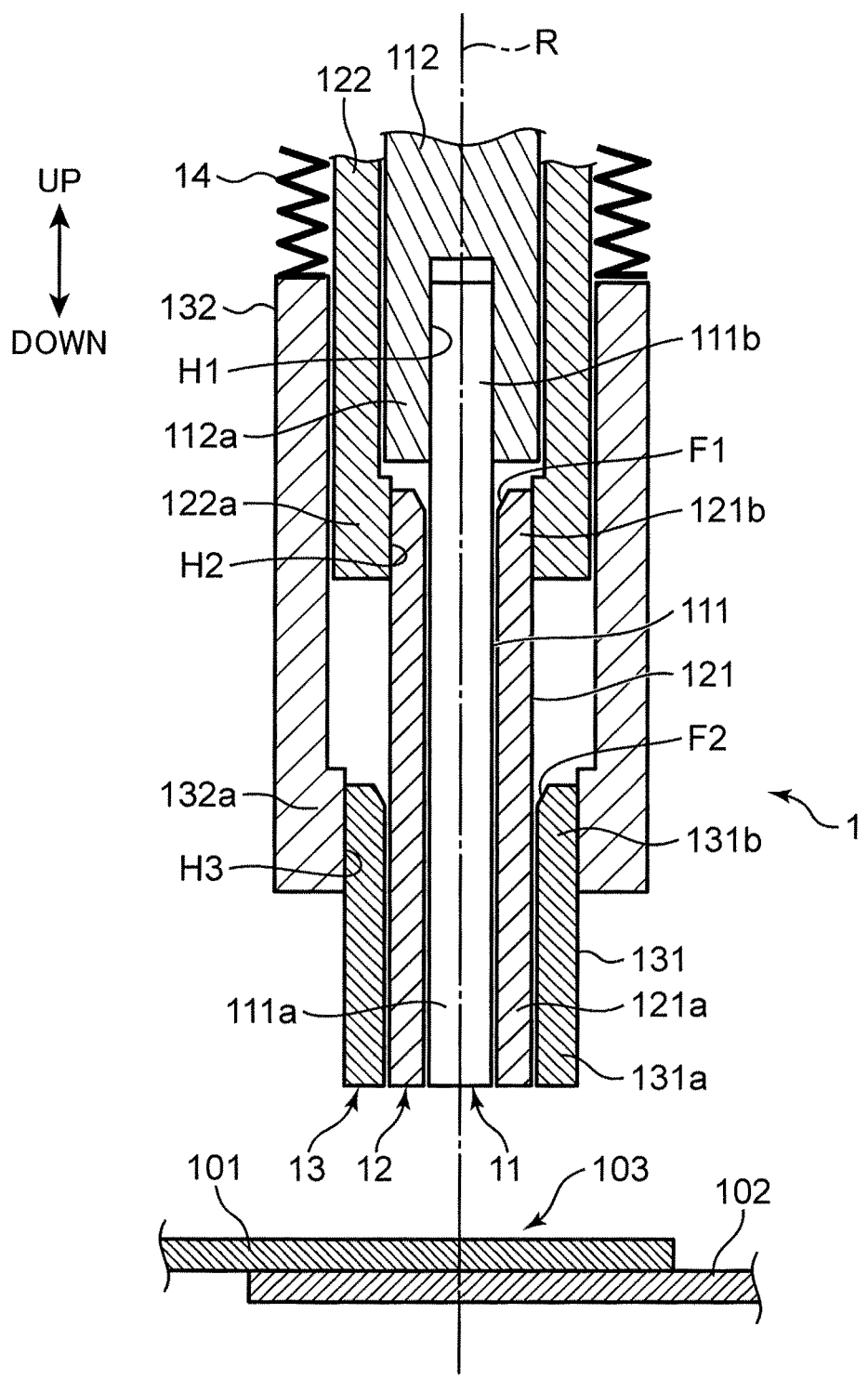
FIG. 4 is an enlarged cross-sectional view of a rotary tool of the friction stir welding device.

FIG. 4 is an enlarged cross-sectional view of the rotary tool 1. As shown in FIG. 4 and FIG. 2, the pin 11 includes the pin main body 111 and a pin adapter 112 that connects the pin main body 111 and the tool driver 3 to each other. The pin main body 111 is a member having a rod shape or a columnar shape extending in the up-down direction along the rotation axis R. The pin adapter 112 is a member having a rod shape and having a size which is larger than the size of the pin main body 111, and extends coaxially with the pin main body 111 above the pin main body 111. A part of a distal end or a lower end of the pin adapter 112 serves as a holding part 112*a* that holds a part of a proximal end, i.e., an upper part 111*b*, of the pin main body 111. Specifically, the holding part 112*a* of the pin adapter 112 has a fit hole H1 in a columnar recess shape opening downward. The pin main body 111 is firmly held by the pin adapter 112 with the upper part 111*b* fitting in the fit hole H1.

Specifically, the pin main body 111 is joined to the pin adapter 112 through shrink-fitting. The shrink-fitting is a known joining way of fitting a shaft in a hole expanded through heating. That is to say, the fit hole H1 of the pin adapter 112 has an inner diameter which is slightly smaller than an outer diameter of the upper part 111*b* of the pin main body 111 at room temperature. In the shrink-fitting, the pin adapter 112 is heated to increase the inner diameter of the fit hole H1, and the upper part 111*b* of the pin main body 111 is inserted in the fit hole H1 having the increased diameter. Thereafter, the pin adapter 112 is cooled to lower the temperature thereof. This results in decreasing the increased diameter of the fit hole H1 and fixedly joining the pin main body 111 to the pin adapter 112.

The pin adapter 112 is connected to the rotation driver 31 and the pin driver 32 (FIG. 2) of the tool driver 3. When the rotation driver 31 and the pin driver 32 cause the pin adapter 112 to rotate, and advance or retract, the pin main body 111 also rotates, and advances or retracts integrally with the pin adapter 112. In other words, the pin adapter 112 holds the pin main body 111 to convey a drive force of the tool driver 3 to the pin main body 111. In welding the overlapping part 103, the pin adapter 112 pushes the pin main body 111 downward while allowing the pin main body to rotate so that a lower part 111a of the pin main body 111 is plunged into the overlapping part 103.

The pin main body 111 has an outer diameter which is uniform in the up-down direction or the axial direction. Specifically, the outer diameter of the pin main body 111 is uniform over the upper part 111b fitted to the pin adapter 112 and the lower part 111a to be plunged into the overlapping part 103. In other words, the pin main body 111 has such a straight rod shape that the outer diameter of the proximal end or the upper part 111b fitted to the pin adapter 112 is the same as an outer diameter of the distal end or the lower part 111a to be plunged into the overlapping part 103.

The shoulder 12 includes the shoulder main body 121 and a shoulder adapter 122 that connects the shoulder main body 121 and the tool driver 3 to each other. The shoulder main body 121 is a member having a cylindrical shape extending in the up-down direction along the rotation axis R. The shoulder main body 121 has a hollow in which the pin main body 111 is inserted, and surrounds an outer periphery of the pin main body 111. The shoulder adapter 122 is a member having a cylindrical shape and having a size which is larger than the size of the shoulder main body 121, and extends coaxially with the shoulder main body 121 above the shoulder main body 121 and surrounds an outer periphery of the pin adapter 112. A part of a distal end or a lower end of the shoulder adapter 122 serves as a holding part 122a that holds a part of a proximal end, i.e., an upper part 121b, of the shoulder main body 121. Specifically, the holding part 122a of the shoulder adapter 122 has a fit hole H2 in the form of a through hole having a circular shape in cross-section. The shoulder main body 121 is firmly held by the shoulder adapter 122 with the upper part 121b fitting in the fit hole H2.

Specifically, the shoulder main body 121 is joined to the shoulder adapter 122 through shrink-fitting in the same manner as the pin main body 111 as described above. That is to say, the fit hole H2 of the shoulder adapter 122 has an inner diameter which is slightly smaller than an outer diameter of the upper part 121b of the shoulder main body 121 at room temperature. In the shrink-fitting, the shoulder adapter 122 is heated to increase the inner diameter of the fit hole H2, and the upper part 121b of the shoulder main body 121 is inserted in the fit hole H2 having the increased diameter. Thereafter, the shoulder adapter 122 is cooled to lower the temperature thereof. This results in decreasing the increased diameter of the fit hole H2 and fixedly joining the shoulder main body 121 to the shoulder adapter 122.

The shoulder adapter 122 is connected to the rotation driver 31 and the shoulder driver 33 (FIG. 2) of the tool driver 3. When the rotation driver 31 and the shoulder driver 33 cause the shoulder adapter 122 to rotate, and advance or retract, the shoulder main body 121 also rotates, and advances or retracts integrally with the shoulder adapter 122. In other words, the shoulder adapter 122 holds the shoulder main body 121 to convey a drive force of the tool driver 3 to the shoulder main body 121. In welding the overlapping part 103, the shoulder adapter 122 pushes the shoulder main body 121 downward while allowing the shoulder main body to rotate so that a lower part 121a of the shoulder main body 121 is plunged into the overlapping part 103.

The shoulder main body 121 has an outer diameter which is uniform in the up-down direction or the axial direction. Specifically, the outer diameter of the shoulder main body 121 is uniform over the upper part 121b fitted to the shoulder adapter 122 and the lower part 121a to be plunged into the overlapping part 103. In other words, the shoulder main body 121 has such a straight cylindrical shape that an outer diameter of the proximal end or the upper part 121b fitted to the shoulder adapter 122 is the same as an outer diameter of the distal end or the lower part 121a to be plunged into the overlapping part 103.

The upper part 121b of the shoulder main body 121 has a chamfer F1. The chamfer F1 is a tapered part resulting from cutting an inner peripheral edge of an upper end of the shoulder main body 121 in adjacent to an end surface of the upper part 121b. The chamfer F1 allows the upper end of the shoulder main body 121 to have, in the hollow, an inner diameter increasing toward the upper end surface.

The clamp 13 includes the clamp main body 131, and a clamp adapter 132 that connects the clamp main body 131 and the tool driver 3 to each other. The clamp main body 131 is a member having a cylindrical shape extending in the up-down direction along the rotation axis R. The clamp main body 131 has a hollow in which the shoulder main body 121 is inserted, and surrounds an outer periphery of the shoulder main body 121. The clamp adapter 132 is a member having a cylindrical shape and having a size which is larger than the size of the clamp main body 131, and extends coaxially with the clamp main body 131 above the clamp main body 131 and surrounds an outer periphery of the shoulder adapter 122. A part of a distal end or a lower end of the clamp adapter 132 serves as a holding part 132a that holds a part of a proximal end, i.e., an upper part 131b, of the clamp main body 131. Specifically, the holding part 132a of the clamp adapter 132 has a fit hole H3 in the form of a through hole having a circular shape in cross-section. The clamp main body 131 is firmly held by the clamp adapter 132 with the upper part 131b fitting in the fit hole H3.

Specifically, the clamp main body 131 is joined to the clamp adapter 132 through shrink-fitting in the same manner as the pin main body 111 and the shoulder main body 121 as described above. That is to say, the fit hole H3 of the clamp adapter 132 has an inner diameter which is slightly smaller than an outer diameter of the upper part 131b of the clamp main body 131 at room temperature. In the shrink-fitting, the clamp adapter 132 is heated to increase the inner diameter of the fit hole H3, and the upper part 131b of the clamp main body 131 is inserted in the fit hole H3 having the increased diameter. Thereafter, the clamp adapter 132 is cooled to lower the temperature thereof. This results in decreasing the increased diameter of the fit hole H3 and fixedly joining the clamp main body 131 to the clamp adapter 132.

The clamp adapter 132 is connected to the clamp driver 34 (FIG. 2) of the tool driver 3 via the spring 14. When the clamp driver 34 causes the clamp adapter 132 to advance or retract, the clamp main body 131 also advances or retracts integrally with the clamp adapter 132. In other words, the clamp adapter 132 holds the clamp main body 131 to convey a drive force of the clamp driver 34 to the clamp main body 131 via the spring 14. In welding the overlapping part 103, the clamp adapter 132 presses the clamp main body 131 against the overlapping part 103 in response to the urging force from the spring 14.

The clamp main body 131 has an outer diameter which is uniform in the up-down direction (the axial direction). Specifically, the outer diameter of the clamp main body 131 is uniform over the upper part 131*b* fitted to the clamp adapter 132 and a lower part 131*a* to come into contact with the overlapping part 103. In other words, the clamp main body 131 has such a straight cylindrical shape that an outer diameter of the proximal end or the upper part 131*b* fitted to the clamp adapter 132 is the same as an outer diameter of the distal end or the lower part 131*a* to come into contact with the overlapping part 103.

The upper part 131*b* of the clamp main body 131 has a chamfer F2. The chamfer F2 is a tapered part resulting from cutting an inner peripheral edge of an upper end of the clamp main body 131 in adjacent to an end surface of the upper part 131*b*. The chamfer F2 allows the upper end of the clamp main body 131 to have, in the hollow, an inner diameter increasing as advancing toward the upper end surface.

As described heretofore, each of the pin 11, the shoulder 12, and the clamp 13 includes the associated main body and the associated adapter joined to each other in combination through shrink-fitting. Specifically, the pin 11 results from shrink-fitting the pin main body 111 to the pin adapter 112. The shoulder 12 results from shrink-fitting the shoulder main body 121 to the shoulder adapter 122. The clamp 13 results from shrink-fitting the clamp main body 131 to the clamp adapter 132. In the embodiment, the associated main body and the associated adapter of each of the pin 11, the shoulder 12, and the clamp 13 are respectively made of different metal materials having different hardness and different thermal expansion coefficients from each other in combination.

Specifically, each of the pin adapter 112, the shoulder adapter 122, and the clamp adapter 132 is made of tool steel. In contrast, each of the pin main body 111, the shoulder main body 121, and the clamp main body 131 is made of cemented carbide. The cemented carbide is an alloy having higher hardness than the tool steel. The reason why the cemented carbide having the characteristics is used as a material for the pin main body 111, the shoulder main body 121, and the clamp main body 131 lies in the fact that each member is a component to be plunged into or come into contact with the overlapping part 103, and thus requires high abrasion resistance.

Besides, the cemented carbide has, in terms of its characteristics, a lower thermal expansion coefficient than the tool steel. That is to say, the pin main body 111 made of cemented carbide has a thermal expansion coefficient which is lower than a thermal expansion coefficient of the pin adapter 112 made of tool steel. Similarly, the shoulder main body 121 has a thermal expansion coefficient which is lower than a thermal expansion coefficient of the shoulder adapter 122, and the clamp main body 131 has a thermal expansion coefficient which is lower than a thermal expansion coefficient of the clamp adapter 132.

Maintenance Method for the Rotary Tool

The pin main body 111, the shoulder main body 121, and the clamp main body 131 each being a component to be plunged into or come into contact with the overlapping part 103 are supposed to deteriorate due to continuous use thereof. For instance, a distal end surface being a surface of each of the respective lower parts 111*a*, 121*a*, and 131*a* of the pin main body 111, the shoulder main body 121, and the clamp main body 131 may be excessively abrased, or a crack may occur on the distal end surface. Thus, a work of periodic replacement of each of the pin main body 111, the shoulder main body 121, and the clamp main body 131 is desired as maintenance for the rotary tool 1. The friction stir welding device M in the embodiment performs welding through the shoulder-preceding process of precedingly plunging the shoulder main body 121 into the overlapping part 103. Hence, in particular, the shoulder main body 121 is most likely to deteriorate among the pin main body 111, the shoulder main body 121, and the clamp main body 131. From this perspective, at least the shoulder main body 121 may be replaced without replacing the pin main body 111 and the clamp main body 131 for the maintenance for the rotary tool 1 in the embodiment. However, a work of maintenance based on the premise of replacement of all the three members of the pin main body 111, the shoulder main body 121, and the clamp main body 131 will be described hereafter.

Figure 5:
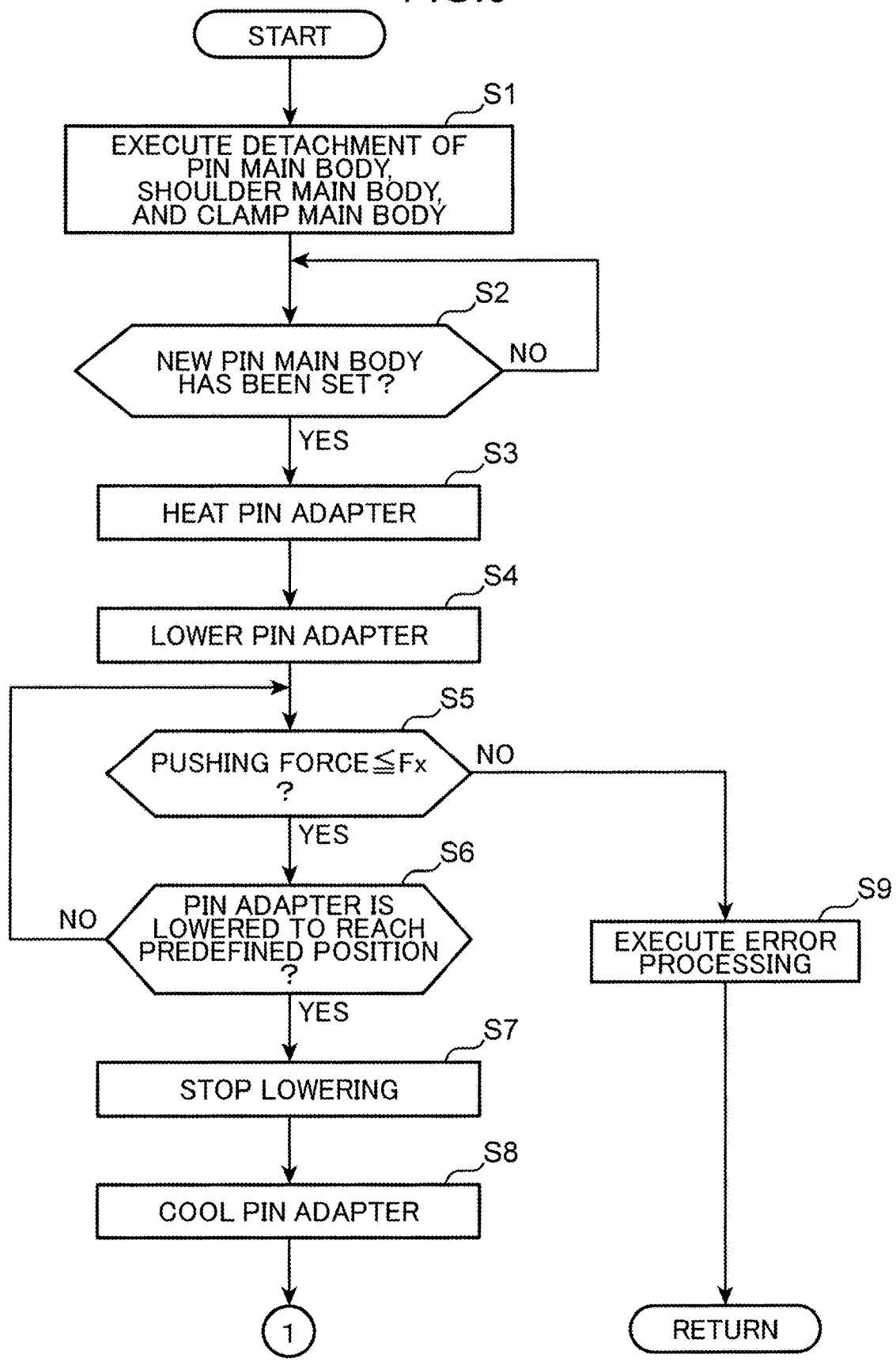
FIG. 5 is a flowchart showing a first stage in a work of maintenance for the rotary tool.
Figure 6:
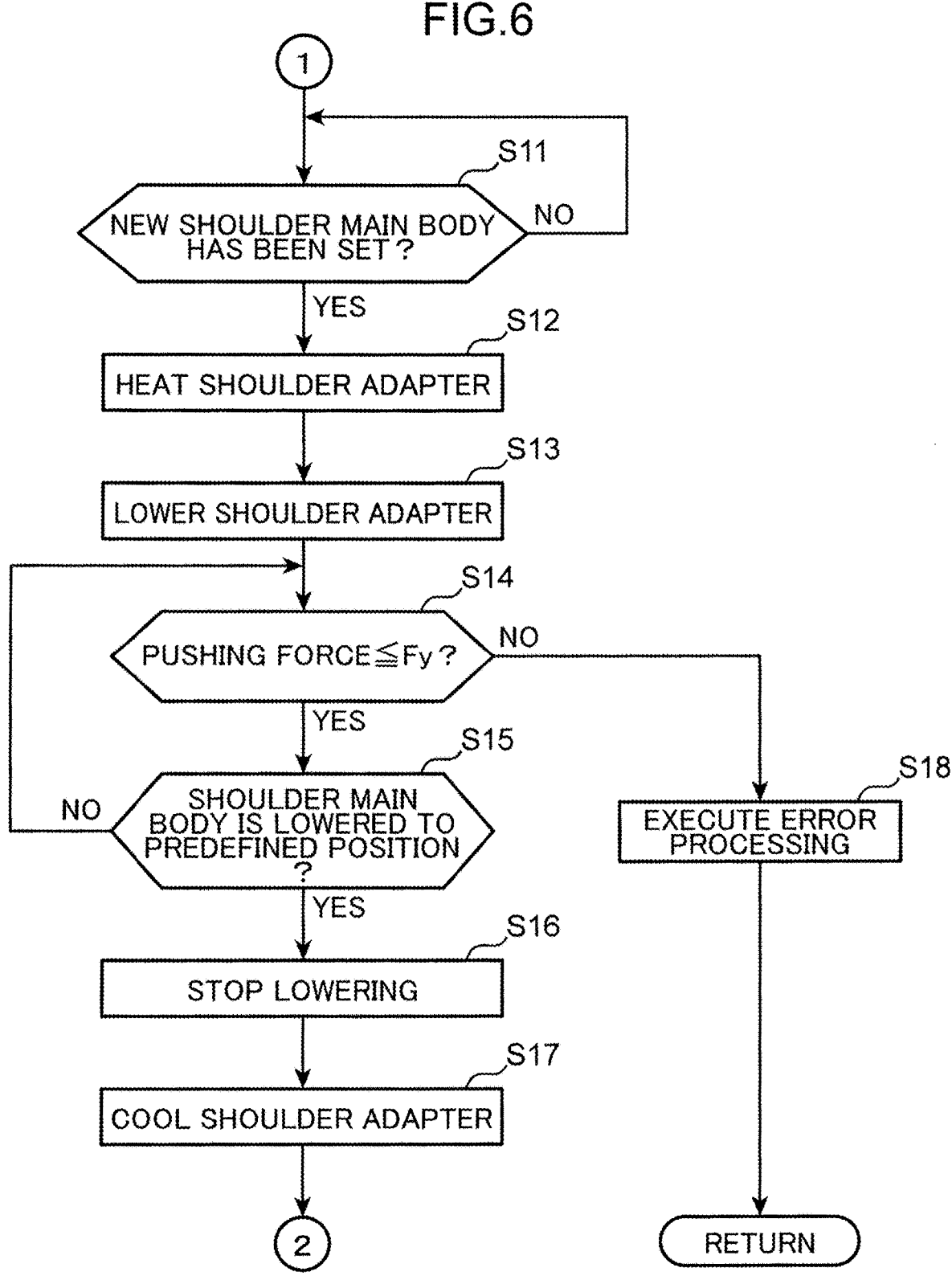
FIG. 6 is a flowchart showing a second stage in the work of maintenance for the rotary tool.
Figure 7:
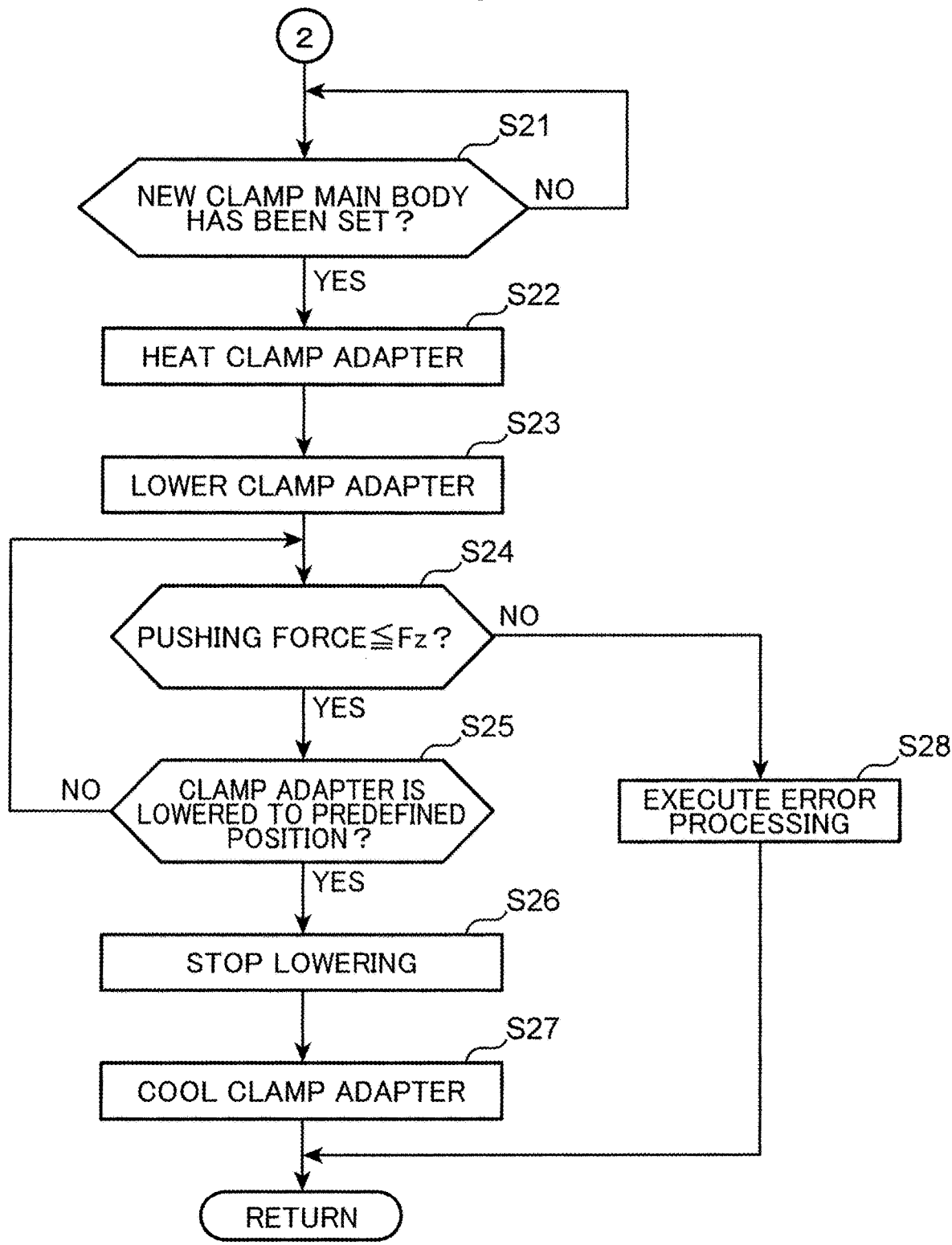
FIG. 7 is a flowchart showing a third stage in the work of maintenance for the rotary tool.

Each of FIG. 5 to FIG. 7 is a flowchart for explaining a procedure of the work of maintenance for the rotary tool 1. In the embodiment, the work of maintenance based on each flowchart is autonomously executed by the controller C in accordance with a predetermined program and is started in response to an input of a predetermined signal instructing the start of the work through manipulation of an operator.

When the control in FIG. 5 is started in response to the input of the signal instructing the start of the work, the controller C executes detachment of the pin main body 111, the shoulder main body 121, and the clamp main body 131 (step S1). The detachment results from releasing the shrink-fitting of each member.

Specifically, in step S1, the controller C causes the heater 6 to heat the pin adapter 112, the shoulder adapter 122, and the clamp adapter 132 to thermally expand the adapters. More specifically, as illustrated in FIG. 8, the controller C controls the electric power supplier 62 to supply electric power to the heating element 61 of the heater 6 and heat the pin adapter 112, the shoulder adapter 122, and the clamp adapter 132 via the heating element 61. The heating by the heater 6 results in raising a temperature of each of the pin adapter 112, the shoulder adapter 122, and the clamp adapter 132, and further raising a temperature of each of the pin main body 111, the shoulder main body 121, and the clamp main body 131 respectively fitted to the associated adapters. As described above, a material for each member is selected so that the thermal expansion coefficient of each of the pin main body 111, the shoulder main body 121, and the clamp main body 131 is lower than the thermal expansion coefficient of each of the pin adapter 112, the shoulder adapter 122, and the clamp adapter 132. From this perspective, it is each adapter that expands more greatly when heated by the heater 6. In other words, the pin adapter 112 thermally expands more greatly than the pin main body 111, the shoulder adapter 122 thermally expands more greatly than the shoulder main body 121, and the clamp adapter 132 thermally expands more greatly than the clamp main body 131. The heating by the heater 6 makes such a difference in thermal expansion and leads to releasing of the shrink-fitting. The releasing of the shrink-fitting enables detachment of the pin main body 111 from the pin adapter 112, detachment of the shoulder main body 121 from the shoulder adapter 122, and detachment of the clamp main body 131 from the clamp adapter 132. For instance, a control of driving the shoulder driver 33 (FIG. 2) to raise the shoulder adapter 122 while holding the shoulder main body 121 with an unillustrated holding mechanism, such as a chuck, is executed to detach the shoulder main body 121. This achieves detachment of the shoulder main body 121 by pulling the upper part 121b of the shoulder main body 121 out of the fit hole H2 of the shoulder adapter 122. The pin main body 111 is detachable from the pin adapter 112 and the clamp main body 131 is detachable from the clamp adapter 132 in the same manner.

Figure 9:
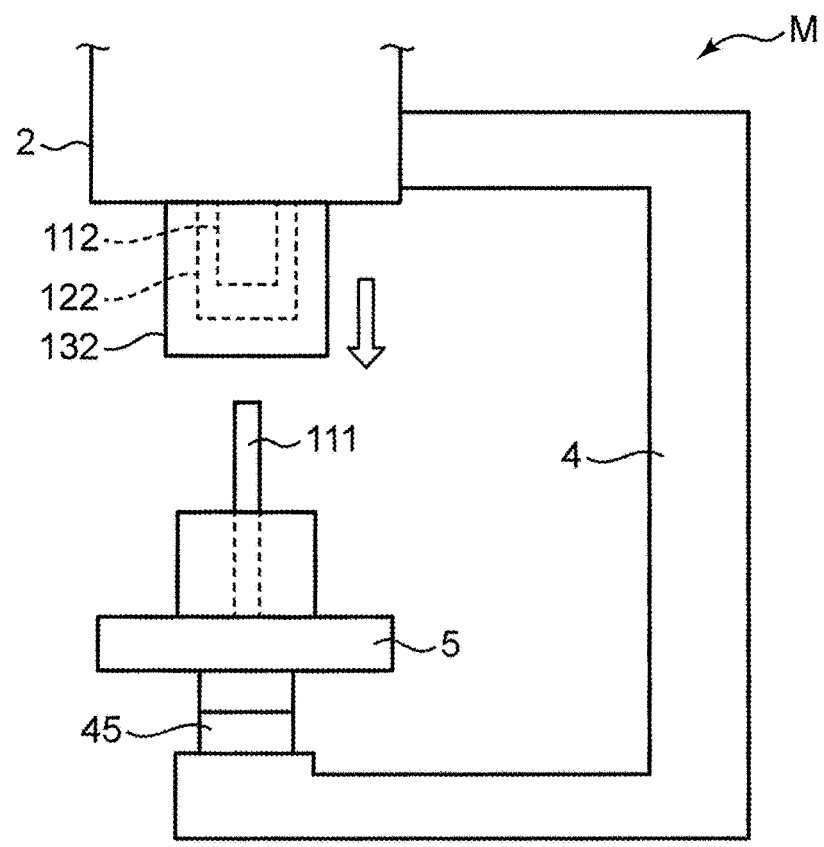
FIG. 9 is an illustration of a state where a pin adapter approaches a set new pin main body in a front view.

Next, the controller C determines whether a new pin main body 111 has been set (step S2). Specifically, after completion of the detachment of the pin main body 111 and other members in step S1, a new pin main body 111 is set on the backing 5 as illustrated in FIG. 9. A set position of the pin main body 111 serves as a predefined position that is defined in advance so that the pin main body 111 and the pin adapter 112 align on the same axis. The controller C recognizes completion of the setting of the new pin main body 111 at an input of a signal giving a notification of the completion.

The new pin main body 111 may be set by the operator through manipulation or set automatically with a predetermined tool exchanger. In the latter case, the friction stir welding device M gets access to the tool changer as the mobile body 110 (FIG. 1) moves to automatically set the new pin main body 111 on the backing 5 of the friction stir welding device M in the access state. The shoulder main body 121 and the clamp main body 131 are also automatically settable at their stetting (S11, S21) in the same manner.

When the determination is "YES" and the completion of the setting of the new pin main body 111 is confirmed in step S2, the controller C causes the heater 6 to heat the pin adapter 112 (step S3). The heating here is achieved through a supply of electric power from the electric power supplier 62 to the heating element 61 in the same manner as in step S1. The heating by the heating element 61 leads to thermal expansion of the pin adapter 112 and an increase in the inner diameter of the fit hole H1.

Subsequently, the controller C lowers the pin adapter 112 (step S4). Specifically, the controller C drives the pin driver 32 (FIG. 2) to lower the pin adapter 112 so that the pin adapter 112 approaches the new pin main body 111 set on the backing 5 as denoted by a white arrow in FIG. 9. In the lowering of the pin adapter 112, the pin driver 32, the shoulder driver 33, and the clamp driver 34 are driven in cooperation to lower the shoulder adapter 122 and the clamp adapter 132 in conjunction with the pin adapter 112.

The controller C then determines whether a pressing force of the pin adapter 112 is not higher than a predetermined threshold Fx (step S5). The pressing force of the pin adapter 112 means a downward pressing force applied from the pin adapter 112 to the pin main body 111 in progress of lowering of the pin adapter 112. The controller C specifies the pressing force on the basis of an output from the loadcell 45 located below the backing 5 and compares the specified pressing force with the threshold Fx to make the determination.

When the determination is "NO" and the pressing force of the pin adapter 112 is confirmed to exceed the threshold Fx in step S5, the controller C executes predetermined processing, such as notifying the operator of an abnormality, as error processing (step S9).

Figure 10:
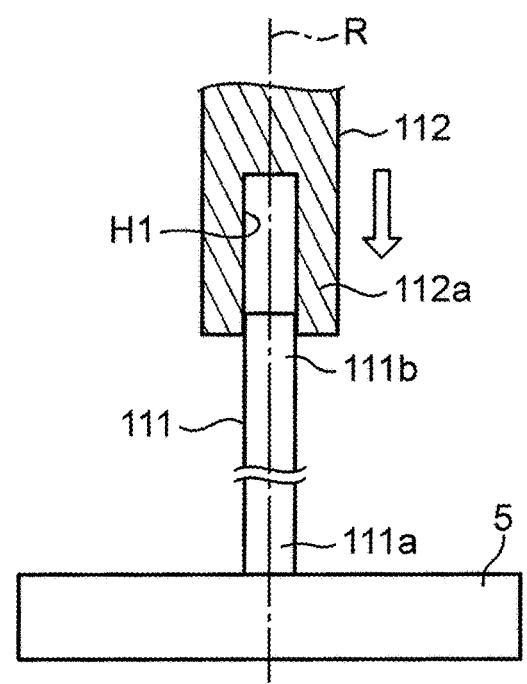
FIG. 10 is an illustration of a state where an upper part of the pin main body is inserted in the pin adapter in cross-section.

Satisfactory heating of the pin adapter 112 by the heater 6 and high concentricity between the pin main body 111 and the pin adapter 112 ensure appropriate insertion of the upper part 111b of the pin main body 111 in the fit hole H1 of the pin adapter 112 in the progress of lowering of the pin adapter 112 as illustrated in FIG. 10. In this case, a resistive force acting on the pin adapter 112 in the insertion does not increase so much. Conversely, unsatisfactory heating of the pin adapter 112 due to a breakdown of the heater 6 or other reason, or significant deviation of the concentricity between the pin main body 111 and the pin adapter 112 makes it difficult to insert the pin main body 111 in the fit hole H1 and causes an excessive resistive force to act on the pin adapter 112. The excess of the pressing force of the pin adapter 112 over the threshold Fx means that the latter factor hinders insertion of the pin main body 111. In step S9, the controller C executes the processing (error processing) of notifying the operator of an occurrence of an abnormality that hinders the insertion.

In contrast, when the determination is "YES" and the pressing force of the pin adapter 112 is confirmed to be not higher than the threshold Fx in step S5, that is, when an error that hinders insertion of the pin main body 111 does not occur, the controller C determines whether the pin adapter 112 is lowered to reach the predefined position that is defined in advance (step S6). For example, the controller C specifies the position of the pin adapter 112 in the up-down direction on the basis of an output from an encoder or a position detector included in the motor of the pin driver 32, and makes the determination on the basis of the specified position.

When the determination is "NO" and the pin adapter 112 is confirmed not to reach the predefined position yet in step S6, the controller C returns to step S5 to subsequently make a determination on the pressing force while lowering the pin adapter 112.

In contrast, when the determination is "YES" and the pin adapter 112 is confirmed to reach the predefined position in step S6, the controller C determines that the upper part 111b of the pin main body 111 is inserted in the fit hole H1 by a planned insertion amount and stops lowering the pin adapter 112 (step S7).

Subsequently, the controller C causes the cooler 7 to cool the pin adapter 112 (step S8). Specifically, the controller C causes the blowing source 72 of the cooler 7 to supply air in such a manner as to blow the air supplied from the blowing source 72 to the rotary tool 1 through the nozzles 71 as illustrated in FIG. 11. The air blown out of the nozzles 71 cools the pin adapter 112 through air cooling. At the time in step S8, only the pin main body 111 is attached to the pin adapter 112, and a shoulder main body 121 is not attached to the shoulder adapter 122 and a clamp main body 131 is not attached to the clamp adapter 132. However, FIG. 11 illustrates the shoulder main body 121 and the clamp main body 131 as well as the pin main body 111 for convenience.

Cooling of the pin adapter 112 in step S8 results in releasing the thermal expansion of the pin adapter 112 to decrease the diameter of the fit hole H1. This allows an upper part 111b of the pin main body 111 to be tighten in the fit hole H1 so that the pin main body 111 is fixedly joined to the pin adapter 112. In other words, the shrink-fitting of the pin main body 111 to the pin adapter 112 is completed.

Figure 12:
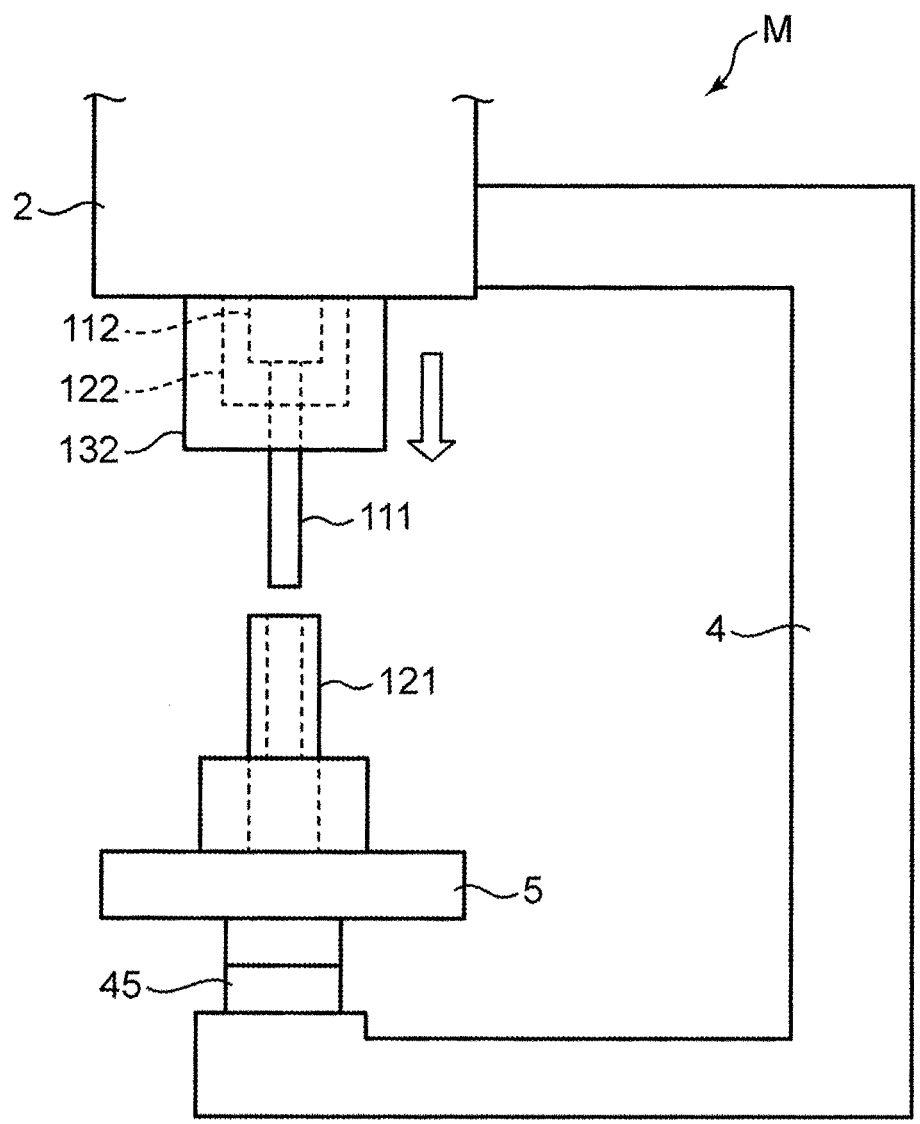
FIG. 12 is an illustration of a state where a shoulder adapter approaches a set new shoulder main body in a front view.

After the completion of the replacement of the pin main body 111 through the above-described process, the flowchart proceeds to steps shown in FIG. 6, and replacement of the shoulder main body 121 is started. At the start of a control in FIG. 6, the controller C determines whether a new shoulder main body 121 has been set (step S11). Specifically, after the completion of the replacement of the pin main body 111 shown in FIG. 5, a new shoulder main body 121 is set on the backing 5 as illustrated in FIG. 12. A set position of the shoulder main body 121 serves as a predefined position that is defined in advance so that the shoulder main body 121 and the shoulder adapter 122 align on the same axis. The controller C recognizes completion of the setting of the new shoulder main body 121 at an input of a signal giving a notification of the completion.

When the determination is "YES" and the completion of the setting of the new shoulder main body 121 is confirmed in step S11, the controller C causes the heater 6 to heat the shoulder adapter 122 (step S12). The heating here is achieved through a supply of electric power from the electric power supplier 62 to the heating element 61 in the same manner as in step S3. The heating by the heating element 61 leads to thermal expansion of the shoulder adapter 122 and an increase in the inner diameter of the fit hole H2.

Subsequently, the controller C lowers the shoulder adapter 122 (step S13). Specifically, the controller C drives the shoulder driver 33 (FIG. 2) to lower the shoulder adapter 122 so that the shoulder adapter 122 approaches the new shoulder main body 121 set on the backing 5 as denoted by the white arrow in FIG. 12. In the lowering of the shoulder adapter 122, the pin driver 32, the shoulder driver 33, and the clamp driver 34 are driven in cooperation to lower the pin adapter 112 and the clamp adapter 132 in conjunction with the shoulder adapter 122.

The controller C then determines whether a pressing force of the shoulder adapter 122, that is, a downward pressing force applied from the shoulder adapter 122 to the shoulder main body 121, is not higher than a predetermined threshold Fy (step S14). The determination is made on the basis of an output from the loadcell 45 in the same manner as in step S5.

When the determination is "NO" and the pressing force of the shoulder adapter 122 is confirmed to exceed the threshold Fy in step S14, the controller C executes predetermined processing, such as notifying the operator of an abnormality, as error processing (step S18). The excess of the pressing force over the threshold Fy means that unsatisfactory heating or deviation of the concentricity hinders the shoulder main body 121 from being inserted in the fit hole H2. Step S18 is intended for notifying the operator of such an occurrence of hinderance.

Figure 13:
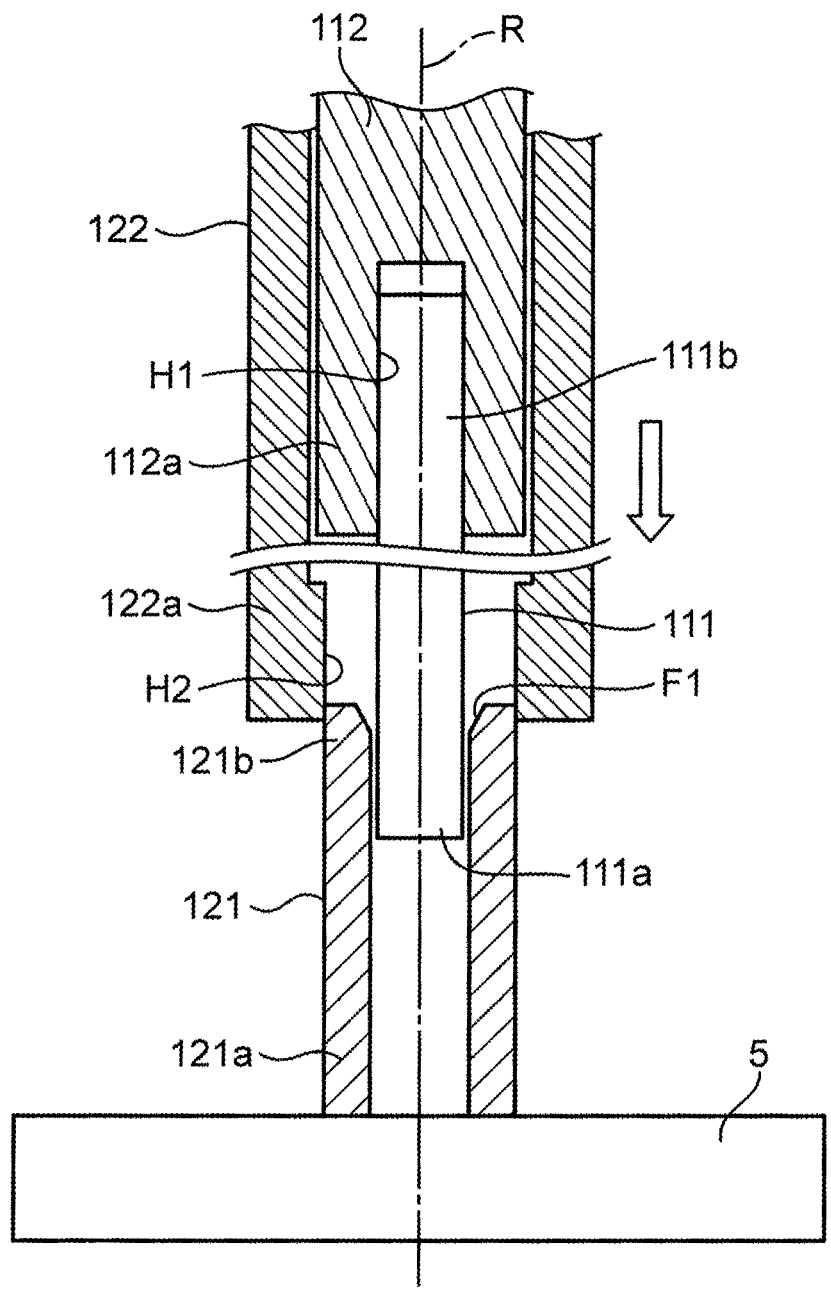
FIG. 13 is an illustration of a state where an upper part of the shoulder main body is inserted in the shoulder adapter in cross-section.

Here, as described heretofore, in the embodiment, the shoulder main body 121 has a chamfer F1 at a peripheral edge defining an opening at the upper end. In the lowering of the shoulder adapter 122, the chamfer F1 exerts a guidance function to easily ensure the concentricity between the shoulder main body 121 and the shoulder adapter 122. This provides an advantageous effect of a reduction in the likelihood of execution of the error processing in step S18. Specifically, a lower part 111a of the pin main body 111 having precedingly undergone the replacement approaches an upper end of the shoulder main body 121 set on the backing 5 as the shoulder adapter 122 is lowered together with the pin adapter 112. At this time, the chamfer F1 at the upper end of the shoulder main body 121 serves to guide the pin main body 111 to be inserted, and thus allows the pin main body 111 to enter the inside of the shoulder main body 121 at a high probability as illustrated in FIG. 13. This makes the axial center of the pin main body 111 align the axial center of the shoulder main body 121, and hence ensures the concentricity between the shoulder main body 121 and the shoulder adapter 122. Thus, an upper part 121b of the shoulder main body 121 is inserted in the fit hole H2 of the shoulder adapter 122 at a high probability under the normal heating of the shoulder adapter 122. This consequently decreases the probability of hindering the insertion of the shoulder main body 121 and increases the probability that the determination is "YES" in step S14.

When the determination is "YES" and the pressing force of the shoulder adapter 122 is confirmed to be not higher than the threshold Fy in step S14, that is, when an error that hinders insertion of the shoulder main body 121 does not occur, the controller C determines whether the shoulder adapter 122 is lowered to reach the predefined position that is defined in advance (step S15). For example, the controller C specifies the position of the shoulder adapter 122 in the up-down direction on the basis of an output from an encoder or a position detector included in the motor of the shoulder driver 33, and makes the determination on the basis of the specified position.

When the determination is "NO" and the shoulder adapter 122 is confirmed not to reach the predefined position yet in step S15, the controller C returns to step S14 to subsequently make a determination on the pressing force while lowering the shoulder adapter 122.

In contrast, when the determination is "YES" and the shoulder adapter 122 is confirmed to reach the predefined position in step S15, the controller C determines that the upper part 121b of the shoulder main body 121 is inserted in the fit hole H2 by a planned insertion amount and stops lowering the shoulder adapter 122 (step S16).

Subsequently, the controller C causes the cooler 7 to cool the shoulder adapter 122 (step S17). The cooling is achieved through a supply of air from the blowing source 72 to the nozzles 71 in the same manner as in step S8. The air blown out of the nozzles 71 cools the shoulder adapter 122 to decrease the inner diameter of the fit hole H2. This allows the upper part 121b of the shoulder main body 121 to be tighten in the fit hole H2 to complete the shrink-fitting of the shoulder main body 121.

Figure 14:
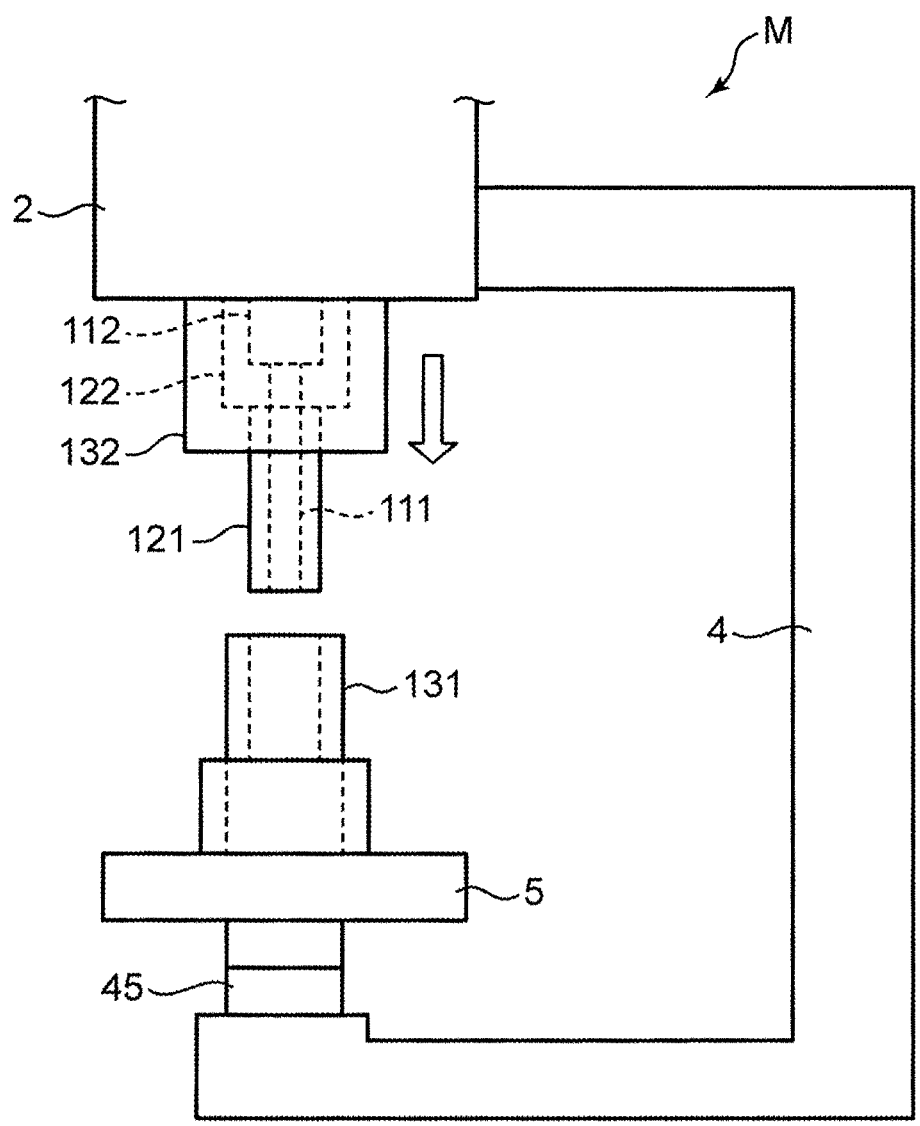
FIG. 14 is an illustration of a state where a clamp adapter approaches a set new clamp main body in a front view.

After the completion of the replacement of the shoulder main body 121 through the above-described process, the flowchart proceeds to steps shown in FIG. 7, and replacement of the clamp main body 131 is started. At the start of a control in FIG. 7, the controller C determines whether a new clamp main body 131 has been set (step S21). Specifically, after the completion of the replacement of the shoulder main body 121 shown in FIG. 6, a new clamp main body 131 is set on the backing 5 as illustrated in FIG. 14. A set position of the clamp main body 131 serves as a predefined position that is set in advance so that the clamp main body 131 and the clamp adapter 132 align on the same axis. The controller C recognizes completion of the setting of the new clamp main body 131 at an input of a signal giving a notification of the completion.

When the determination is "YES" and the completion of the setting of the new clamp main body 131 is confirmed in step S21, the controller C causes the heater 6 to heat the clamp adapter 132 (step S22). The heating here is achieved through a supply of electric power from the electric power supplier 62 to the heating element 61 in the same manner as in steps S3 and S12. The heating by the heating element 61 leads to thermal expansion of the clamp adapter 132 and an increase in the inner diameter of the fit hole H3.

Subsequently, the controller C lowers the clamp adapter 132 (step S23). Specifically, the controller C drives the clamp driver 34 (FIG. 2) to lower the clamp adapter 132 so that the clamp adapter 132 approaches the new clamp main body 131 set on the backing 5 as denoted by the white arrow in FIG. 14. In the lowering of the clamp adapter 132, the pin driver 32, the shoulder driver 33, and the clamp driver 34 are driven in cooperation to lower the pin adapter 112 and the shoulder adapter 122 in conjunction with the clamp adapter 132.

The controller C then determines whether a pressing force of the clamp adapter 132, that is, a downward pressing force applied from the clamp adapter 132 to the clamp main body 131, is not higher than a predetermined threshold Fz (step S24). The determination is made on the basis of an output from the loadcell 45 in the same manner as in steps S5 and S14.

When the determination is "NO" and the pressing force of the clamp adapter 132 is confirmed to exceed the threshold Fz in step S24, the controller C executes predetermined processing, such as notifying the operator of an abnormality, as error processing (step S28). The excess of the pressing force over the threshold Fz means that unsatisfactory heating or deviation of the concentricity hinders the clamp main body 131 from being inserted in the fit hole H3. Step S28 is intended for notifying the operator of such an occurrence of hinderance.

Figure 15:
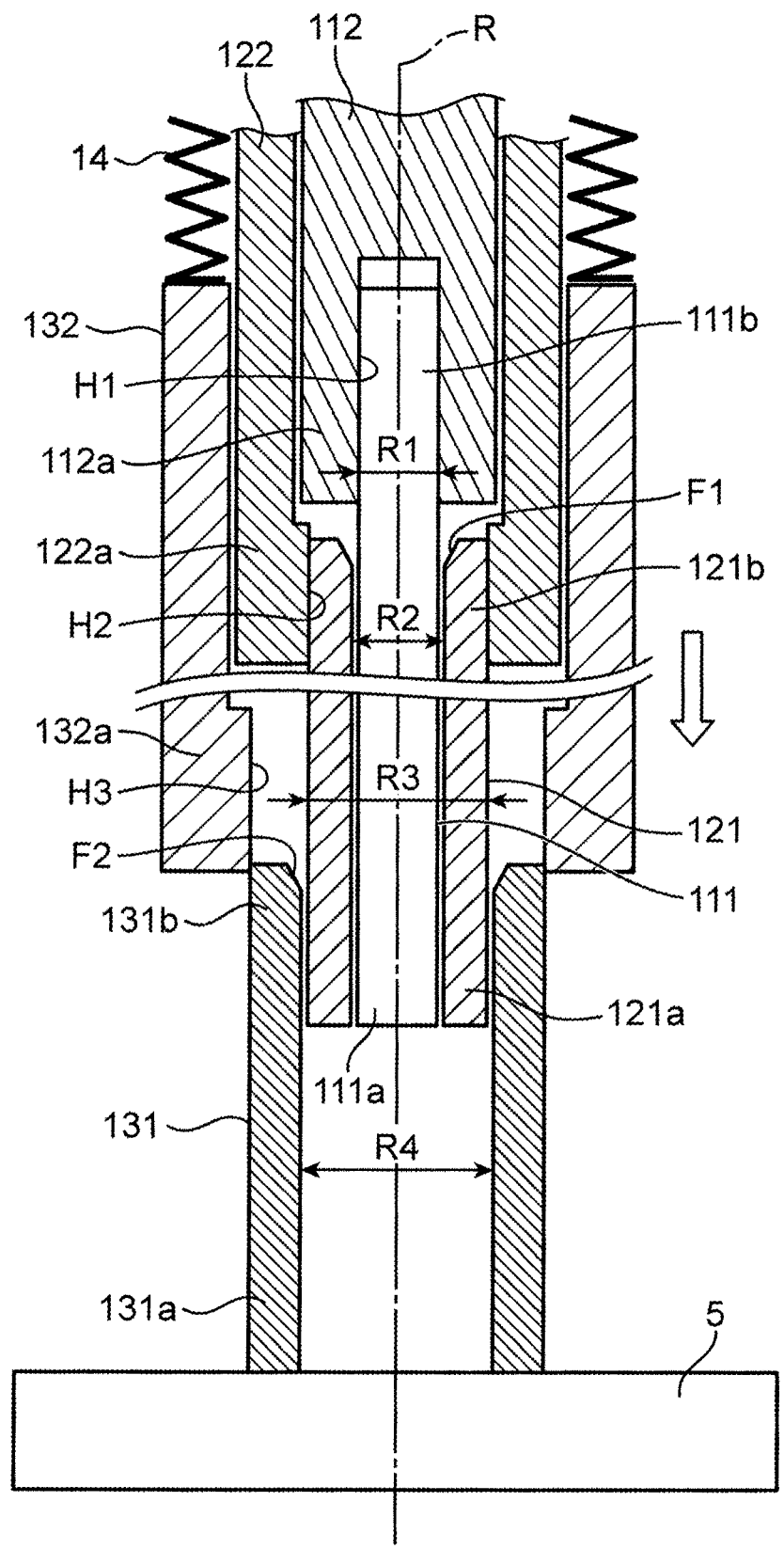
FIG. 15 is an illustration of a state where an upper part of the clamp main body is inserted in the clamp adapter in cross-section.

In this regard, the error processing in step S28 is less likely to be executed in the embodiment. The reason for the lower likelihood is similar to the reason described for step S18 above. Specifically, in the embodiment, the clamp main body 131 has a chamfer F2 at a peripheral edge defining an opening at the upper end. The chamfer F2 hence exerts a guidance function to allow the shoulder main body 121 having precedingly undergone the replacement to enter the inside of the clamp main body 131 at a high probability as illustrated in FIG. 15. This results in easily ensuring the concentricity between the clamp main body 131 and the clamp adapter 132. Thus, an upper part 131b of the clamp main body 131 is inserted in the fit hole H3 of the clamp adapter 132 at a high probability under the normal heating of the clamp adapter 132. This consequently decreases the probability of hindering the insertion of the clamp main body 131 and increases the probability that the determination is "YES" in step S24.

In contrast, when the determination is "YES" and the pressing force of the clamp adapter 132 is confirmed to be not higher than the threshold Fz in step S24, that is, when an error that hinders insertion of the clamp main body 131 does not occur, the controller C determines whether the clamp adapter 132 is lowered to reach the predefined position that is defined in advance (step S25). For example, the controller C specifies the position of the clamp adapter 132 in the up-down direction on the basis of an output from an encoder or a position detector included in the motor of the clamp driver 34, and makes the determination on the basis of the specified position.

When the determination is "NO" and the clamp adapter 132 is confirmed not to reach the predefined position yet in step S25, the controller C returns to step S24 to subsequently make a determination on the pressing force while lowering the clamp adapter 132.

In contrast, when the determination is "YES" and the clamp adapter 132 is confirmed to reach the predefined position in step S25, the controller C determines that the upper part 131b of the clamp main body 131 is inserted in the fit hole H3 by a planned insertion amount and stops lowering the clamp adapter 132 (step S26).

Subsequently, the controller C causes the cooler 7 to cool the clamp adapter 132 (step S27). The cooling is achieved through a supply of air from the blowing source 72 to the nozzles 71 in the same manner as in steps S8 and S17. The air blown out of the nozzles 71 cools the clamp adapter 132 to decrease the inner diameter of the fit hole H3. This allows the upper part 131b of the clamp main body 131 to be tighten in the fit hole H3 to complete the shrink-fitting of the clamp main body 131.

Operational Effects

As described heretofore, in the embodiment, the pin main body 111, the shoulder main body 121, and the clamp main body 131 are respectively joined to the pin adapter 112, the shoulder adapter 122, and the clamp adapter 132 through shrink-fitting. This succeeds in a component cost reduction, in improvement in the maintainability, and further in enhanced merchantability of the friction stir welding device M.

For instance, in the configuration of the embodiment in which the shoulder main body 121 is joined to the shoulder adapter 122 through shrink-fitting, the shoulder main body 121 and the shoulder adapter 122 are respectively made of suitable materials to meet their respective demand characteristics. Specifically, the shoulder main body 121 to be directly plunged into a welding target or the overlapping part 103 may be made of cemented carbide having high abrasion resistance. The shoulder adapter 122 to hold the shoulder main body 121 may be made of steel (tool steel in the embodiment) having lower hardness than the cemented carbide and being available at a lower cost than the cost for the cemented carbide. The configuration attains a lower total component cost for the shoulder 12 than a configuration including, for example, a shoulder main body 121 and a shoulder adapter 122 integrally made of cemented carbide.

Further, replacement of only the shoulder main body 121 is attained while the shoulder adapter 122 is kept used in concern about deterioration of the shoulder main body 121 due to continuous use thereof, and thus, the configuration has an advantage in improvement in the maintainability. Specifically, the shoulder main body 121 is joined to the shoulder adapter 122 through shrink-fitting. Heating the shoulder adapter 122 in this state to thermal expand results in releasing the shrink-fitting and thus detaching the shoulder main body 121 from the shoulder adapter 122. Then, a new shoulder main body 121 is inserted in the fit hole H2 of the thermally expanded shoulder adapter 122, and thereafter, the shoulder adapter 122 is cooled to shrink. The shrinking allows the new shoulder main body 121 to be fixedly attached to the shoulder adapter 122. In this manner, the embodiment in which replacement of only the shoulder main body 121 is attained while the shoulder adapter 122 is kept used achieves saving of the component replacement cost and improvement in the maintainability.

The embodiment adopting the cemented carbide as a material for the shoulder main body 121 and the tool steel as a material for the shoulder adapter 122 achieves a higher thermal expansion coefficient of the shoulder adapter 122 than the thermal expansion coefficient of the shoulder main body 121. In this configuration, heating the shoulder adapter 122 at the replacement of the shoulder main body 121 allows the shoulder adapter 122 to thermally expand to a larger extent than the shoulder main body 121. Such thermal expansion releases the shrink-fitting, so that the shoulder main body 121 is detachable. Accordingly, the shoulder main body 121 is easily and reliably replaceable with a new one.

The advantageous effect described above is attainable for the pin main body 111 and the clamp main body 131 in the same manner. Specifically, a suitable material to meet the demand characteristics for each of the pin main body 111 and the pin adapter 112 is selectable, and replacement of only the pin main body 111 is attained while the pin adapter 112 is kept used at maintenance. Similarly, a suitable material to meet the demand characteristics for each of the clamp main body 131 and the clamp adapter 132 is selectable, and replacement of only the clamp main body 131 is attained while the clamp adapter 132 is kept used at maintenance. This achieves saving of the component cost and the maintenance cost.

In the embodiment, each of the pin main body 111 and the shoulder main body 121 has a straight shape to have a uniform outer diameter in the up-down direction or the axial direction. The shape is advantageous to facilitate the replacement of the pin main body 111 and the shoulder main body 121.

For instance, in a case where the outer diameter of the upper part 121b of the shoulder main body 121 is larger than the outer diameter of the lower part 121a of thereof, the upper part 121b is likely to come into contact with the clamp adapter 132 at the replacement of the shoulder main body 121. In this case, the clamp adapter 132 is required to be detached in advance of the replacement of the shoulder main body 121. Similarly, in a case where the outer diameter of the upper part 111b of the pin main body 111 is larger than the outer diameter of the lower part 111a thereof, the shoulder adapter 122 is required to be detached in advance of the replacement of the pin main body 111. In contrast, in the embodiment including the pin main body 111 and the shoulder main body 121 each having the straight shape, the pin main body 111 and the shoulder main body 121 are respectively replaceable while the shoulder adapter 122 and the clamp adapter 132 are kept attached. This leads to a decrease in the number of procedures required for the replacement and achieves a facilitated work of maintenance.

FIG. 5 to FIG. 15 show an example of replacement of the three members of the pin main body 111, the shoulder main body 121, and the clamp main body 131. However, the shoulder main body 121 is most likely to deteriorate among the members. Thus, only the shoulder main body 121 may be replaced while the pin main body 111 and the clamp main body 131 are kept used. The configuration in the embodiment attains sufficiently increased work efficiency in the replacement of only the shoulder main body 121 as well.

Specifically, in the embodiment, each of the pin main body 111, the shoulder main body 121 surrounding the outer periphery thereof, and the clamp main body 131 further surrounding the outer periphery of the shoulder main body has a straight shape. As illustrated in FIG. 15, this configuration establishes, over an entire region in the axial direction, a relation that an outer diameter R3 of the shoulder main body 121 is smaller than an inner diameter R4 of the clamp main body 131 and a relation that an outer diameter R1 of the pin main body 111 is smaller than an inner diameter R2 of the shoulder main body 121. This means that the shoulder main body 121 is independently detachable from the shoulder adapter 122 while the clamp main body 131 is joined to the clamp adapter 132 and the pin main body 111 is joined to the pin adapter 112. Conclusively, the embodiment enables independent replacement of only the shoulder main body 121 which is likely to deteriorate while keeping the clamp main body 131 and the pin main body 111 used. The embodiment hence achieves effective improvement in the replacement workability of the shoulder main body 121 and in the maintainability of the rotary tool 1.

Modifications

Figure 16:
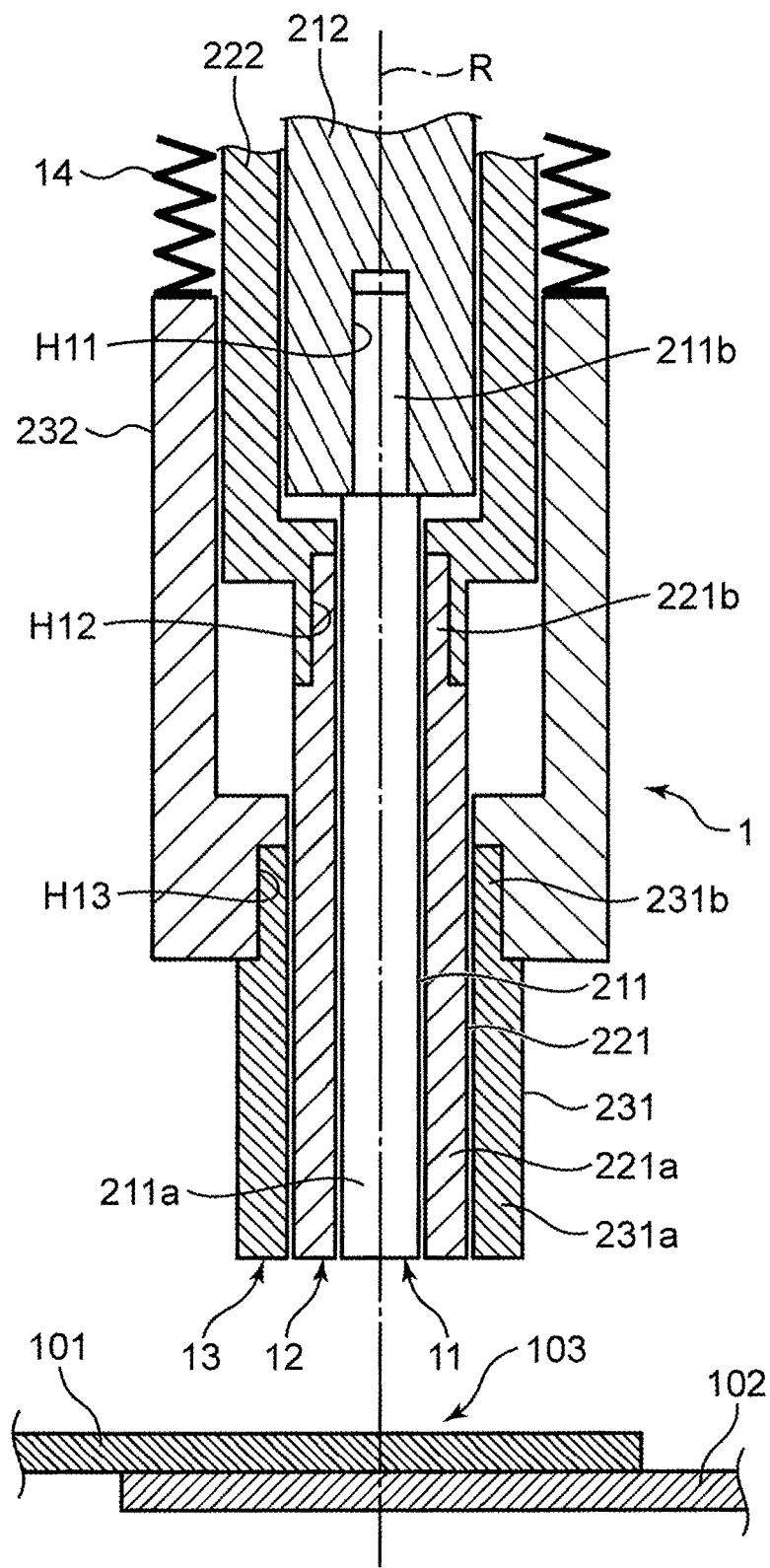
FIG. 16 is an illustration for explaining a modification of the first embodiment and corresponds to FIG. 4.

Although each of the pin main body 111, the shoulder main body 121, and the clamp main body 131 has a straight shape extending in the up-down direction or axial direction with a uniform outer diameter in the first embodiment, each of these members may not necessarily have the straight shape and may have a shape with an outer diameter which changes. For instance, each member may have such a stepped shape that an upper part thereof has an outer diameter which is relatively small. FIG. 16 shows an example adopting the stepped shape. Specifically, in a modification shown in FIG. 16, a pin main body 211 has an upper part 211b or a proximal end fitting in a fit hole H11 of a pin adapter 212 and a lower part 211a or a distal end to be plunged into an overlapping part 103. The upper part 211b has an outer diameter which is smaller than an outer diameter of the lower part 211a. Similarly, a shoulder main body 221 has an upper part 221b or a proximal end fitting in a fit hole H12 of a shoulder adapter 222 and a lower part 221a or a distal end to be plunged into the overlapping part 103. The upper part 221b has an outer diameter which is smaller than an outer diameter of the lower part 221a. A clamp main body 231 has an upper part 231b or a proximal end fitting in a fit hole H13 of a clamp adapter 232 and a lower part 231a or a distal end to be plunged into the overlapping part 103. The upper part 231b has an outer diameter which is smaller than an outer diameter of the lower part 231a. This configuration also attains ensured easy replaceability of the pin main body 211, the shoulder main body 221, and the clamp main body 231, and enables appropriate joining of each member to the associated adapter through shrink-fitting. Although the example adopting a stepped shape with a smaller diameter at an upper part for each of the pin main body 111, the shoulder main body 121, and the clamp main body 131 is described with reference to FIG. 16, the stepped shape may be applied to a part of these members. For instance, the stepped shape may be given only to each of the pin main body 111 and the shoulder main body 121 except the clamp main body 13.

Figure 17:
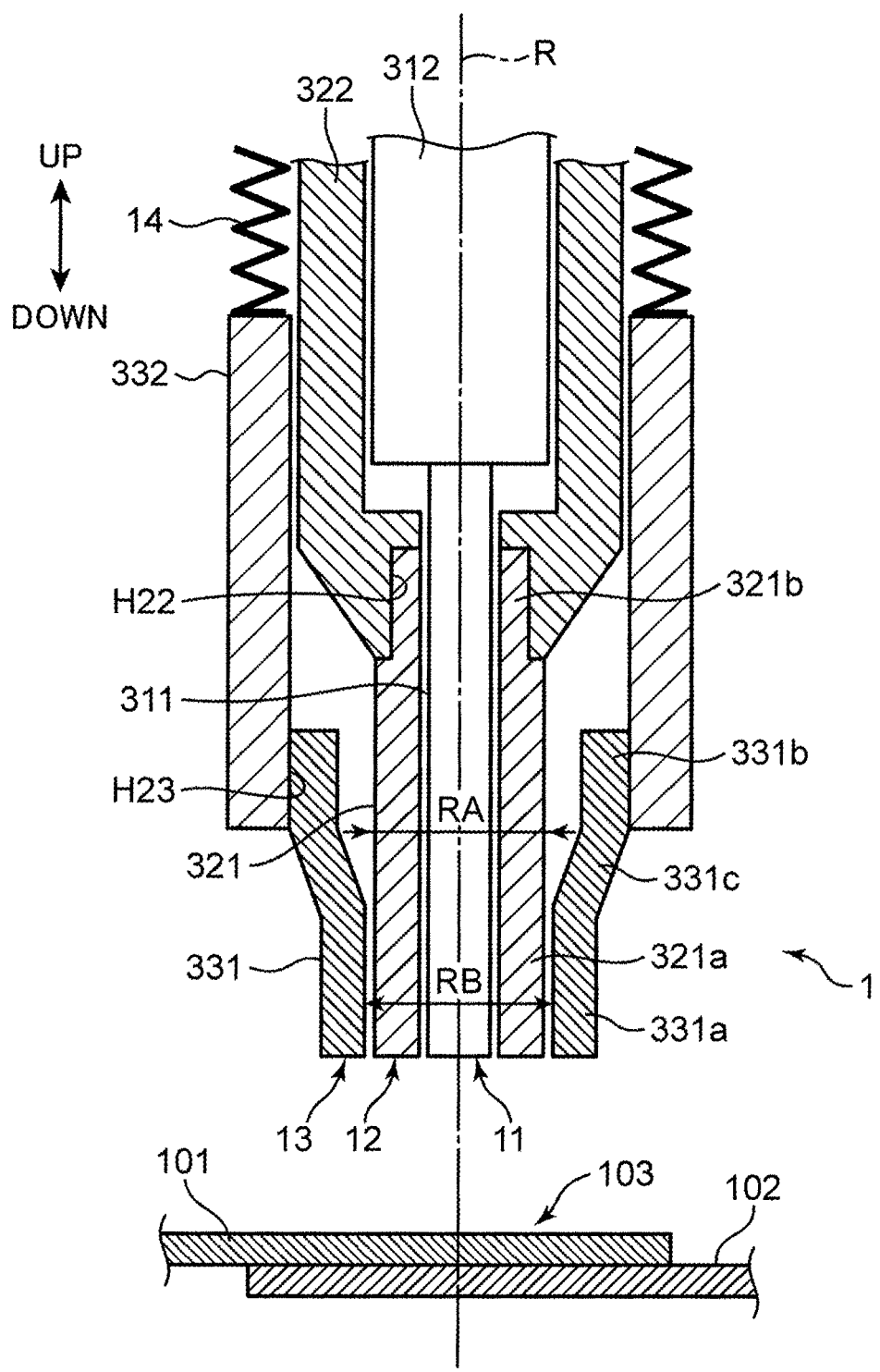
FIG. 17 is an illustration for explaining another modification of the first embodiment and corresponds to FIG. 4.

Alternatively, such a stepped shape that an upper part has a larger diameter may be adopted contrary to the stepped shape in the modification in FIG. 16. For instance, FIG. 17 shows an example application where a clamp main body 331 has such a stepped shape that an upper part has a larger diameter. Specifically, in the modification shown in FIG. 17, the clamp main body 331 has an upper part 331b or a proximal end fitting in a fit hole H23 of a clamp adapter 332, a lower part 331a or a distal end to come into contact with an overlapping part 103, and an intermediate part 331c between the upper part 331b and the lower part 331a. The upper part 331b has an inner diameter and an outer diameter which are larger than an inner diameter and an outer diameter of the lower part 331a. The intermediate part 331c has a diameter decreasing downward to smoothly connect the upper part 331b and the lower part 331a to each other. In contrast, a shoulder main body 321 has a shape which is different from the shape of the clamp main body 331. Specifically, the shoulder main body 321 has an upper part 321b or a proximal end fitting in a fit hole H22 of a shoulder adapter 322 and a lower part 321a or a distal end to be plunged into an overlapping part 103. The upper part 321b has an outer diameter which is smaller than an outer diameter of the lower part 321a. Besides, the shoulder main body 321 is defined to have a uniform inner diameter in the axial direction. A shape of a pin main body 311 is not particularly limited, but the pin main body 311 has a uniform outer diameter in a region below a pin adapter 312.

As described above, in the modification in FIG. 17, a change tendency of each of the inner and outer diameters of the shoulder main body 321 differs from a change tendency of each of the inner and outer diameters of the clamp main body 331 in an axial direction. In the modification, the shoulder main body 321 has a maximum outer diameter RA which is smaller than a minimum inner diameter RB of the clamp main body 331. The modification hence provides the same advantageous effect as the advantageous effect of the first embodiment, that is, no need for detachment of the clamp main body 331 at independent replacement of the shoulder main body 321. In other words, the outer diameter of the lower part 321a of the shoulder main body 321 is inevitably smaller than the inner diameter of the lower part 331*a* of the clamp main body 331 for arrangement of the shoulder main body 321 inside the clamp main body 331. Here, when the outer diameter of the lower part 321*a* of the shoulder main body 321 is defined as "RA", the "RA" is said to indicate a maximum value of the outer diameter of the shoulder main body 321, that is, can be rephrased as a maximum outer diameter of the shoulder main body 321. When the inner diameter of the lower part 331*a* of the clamp main body 331 is defined as "RB", the "RB" is said to indicate a minimum value of the inner diameter of the clamp main body 331, that is, can be rephrased as a minimum inner diameter of the clamp main body 331. From these perspectives, the modification in FIG. 17 establishes a relation that the maximum outer diameter RA of the shoulder main body 321 is smaller than the minimum inner diameter RB of the clamp main body 331. This means that the shoulder main body 321 is attachable to and detachable from the shoulder adapter 322 while the clamp main body 331 is kept joined to the clamp adapter 332. In this manner, the modification in FIG. 17 has no need for preliminary detachment of the clamp main body 331 at replacement of the shoulder main body 321 regardless of the the upper part of the clamp main body 331 in a shape with the larger diameter. The modification is therefore advantageous in ensuring sufficiently high attachment stiffness of the clamp main body 331 and improving the replacement workability of the shoulder main body 321. A further change may be added to the modification in FIG. 17 to allow the shoulder main body 321 to have a straight shape in the same manner as the shoulder main body 121 in the first embodiment.

In the first embodiment, the pin main body 111, the shoulder main body 121, and the clamp main body 131 are respectively joined to the associated adapters through shrink-fitting. However, at least the shoulder main body, which is most likely to deteriorate, may be joined through shrink-fitting without indispensable requirement for joining of the pin main body and the clamp main body through shrink-fitting.

Although the shoulder adapter 122 is made of tool steel and the shoulder main body 121 is made of cemented carbide in the first embodiment, specific materials for these members may be appropriately changeable in any combination as long as the thermal expansion coefficient of the shoulder adapter 122 is higher than the thermal expansion coefficient of the shoulder main body 121 and the stiffness of the shoulder main body 121 is higher than the stiffness of the shoulder adapter 122. For instance, alloy steel for machine structure, such as SCM435, carbon steel for machine structure, such as S45C, or stainless steel may be adopted for a material for the shoulder adapter 122. A cubic boron nitride (CBN) sintered object (polycrystalline cubic boron nitride: PCBN sintered object), a polycrystalline diamond (PCD), or a ceramic member may be adopted, or high-melting point alloy, such as Co-base alloy, an Ni-base alloy, and IR-base alloy may be adopted for a material for the shoulder main body 121. This is applicable to a combination of materials for the pin adapter 112 and the pin main body 111 and to a combination of materials for the clamp adapter 132 and the clamp main body 131.

Although the loadcell 45 located below the backing 5 is used to measure a pressing force or an axial load at replacement of the tool in the first embodiment, the pressing force may be measured, for example, on the basis of an actuating current of the motor in the tool driver 3.

(2) Second Embodiment

Described in the first embodiment and the modifications thereof is setting of a dimensional relation suitable for replacement of only a shoulder main body while a clamp main body is kept attached. In this regard, such setting of the dimensional relation is not indispensable. Hereinafter, a dimensional relation example defined on the premise of detachment of a clamp main body at replacement of a shoulder main body will be described in a second embodiment.

Figure 18:
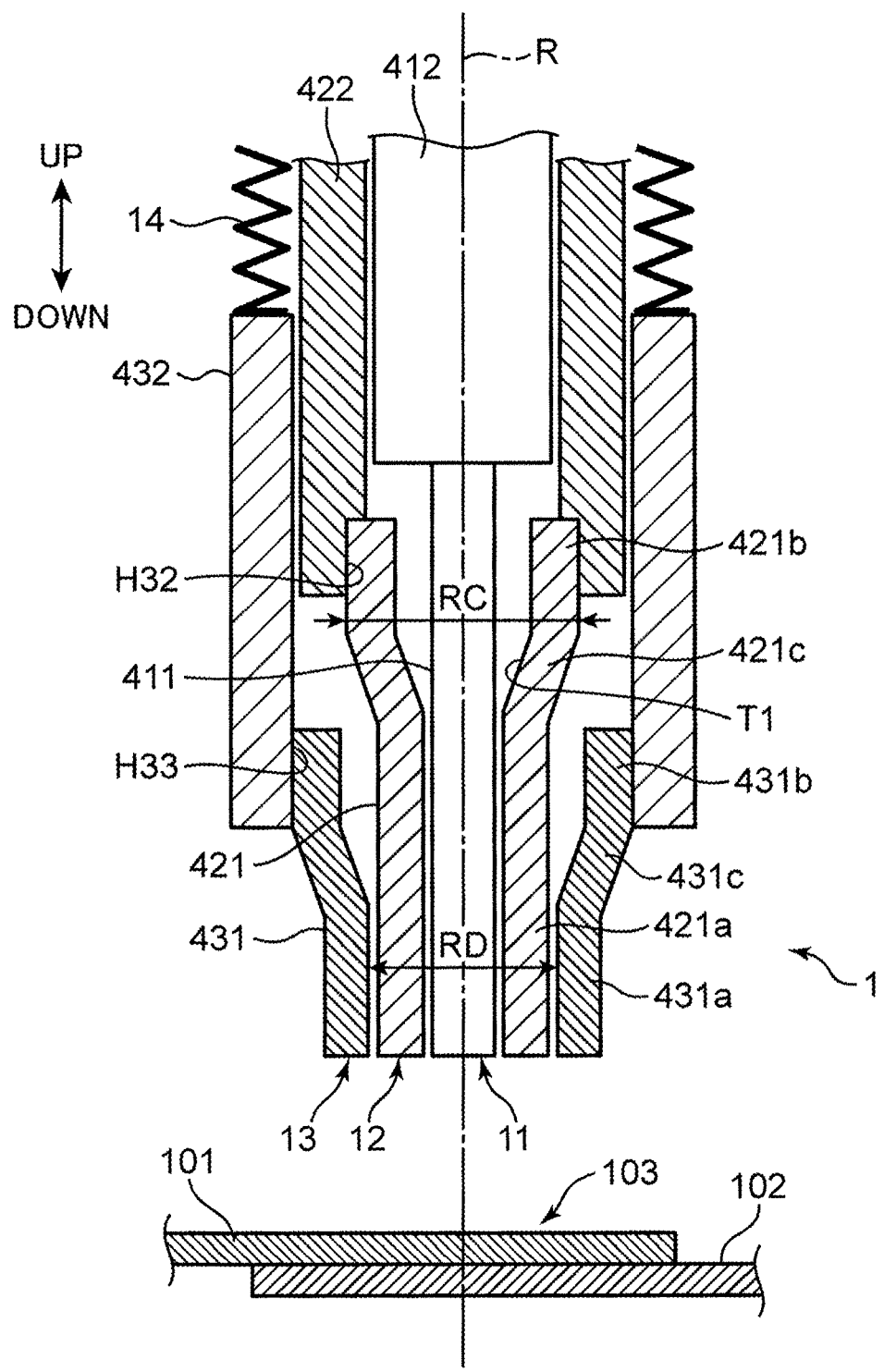
FIG. 18 is a cross-sectional view of a rotary tool in a second embodiment of the present disclosure.

FIG. 18 is a cross-sectional view of a rotary tool 1 in a friction stir welding device M in the second embodiment of the present disclosure. The rotary tool 1 illustrated in the drawing includes: a pin 11 including a pin adapter 412 and a pin main body 411 shrink-fitted to the pin adapter 412; a shoulder 12 including a shoulder adapter 422 and a shoulder main body 421 shrink-fitted to the shoulder adapter 422; and a clamp 13 including a clamp adapter 432 and a clamp main body 431 shrink-fitted to the clamp adapter 432. Each of the shoulder main body 421 and the clamp main body 431 has an upper part having a stepped shape with a larger diameter unlike the shoulder main body and the clamp main body in the first embodiment.

Specifically, the shoulder main body 421 has an upper part 421*b* or a proximal end fitting in a fit hole H32 of the shoulder adapter 422, a lower part 421*a* or a distal end to be plunged into an overlapping part 103, and an intermediate part 421*c* between the upper part 421*b* and the lower part 421*a*. The upper part 421*b* has an inner diameter and an outer diameter which are larger than an inner diameter and an outer diameter of the lower part 421*a*. The intermediate part 421*c* has a diameter decreasing downward to smoothly connect the upper part 421*b* and the lower part 421*a* to each other.

The intermediate part 421*c* of the shoulder main body 421 has an inner surface being a tapered surface with an inner diameter decreasing downward. In other words, the shoulder main body 421 has an inner surface having a tapered part T1 with an inner diameter decreasing as advancing toward a leading end thereof.

The clamp main body 431 has an upper part 431*b* or a proximal end fitting in a fit hole H33 of the clamp adapter 432, a lower part 431*a* or a distal end to come into contact with the overlapping part 103, and an intermediate part 431*c* between the upper part 431*b* and the lower part 431*a*. The upper part 431*b* has an inner diameter and an outer diameter which are larger than an inner diameter and an outer diameter of the lower part 431*a*. The intermediate part 431*c* has a diameter decreasing downward to smoothly connect the upper part 431*b* and the lower part 431*a* to each other.

In the second embodiment, the outer diameter of the upper part 421*b* of the shoulder main body 421, that is, a maximum outer diameter RC of the shoulder main body 421 is larger than the inner diameter of the lower part 431*a* of the clamp main body 431, that is, larger than a minimum inner diameter RD of the clamp main body 431. The configuration thus requires preliminary detachment of the clamp main body 431 for replacement of the shoulder main body 421 unlike the configuration in the first embodiment. In contrast, the second embodiment in which respective upper parts of the shoulder main body 421 and the clamp main body 431 have larger diameters is advantageous in ensuring sufficiently high attachment stiffness of the shoulder main body 421 and the clamp main body 431.

Besides, in the second embodiment, the inner diameter of the upper part 421*b* of the shoulder main body 421 is larger than the inner diameter of the lower part 421*a*, and the intermediate part 421*c* located between the upper and lower parts has the inner surface having the tapered part T1. The second embodiment is hence further advantageous in improvement in an accuracy of determining a position of the shoulder main body 421 at replacement of the shoulder main body 421 as described below.

Figure 19:
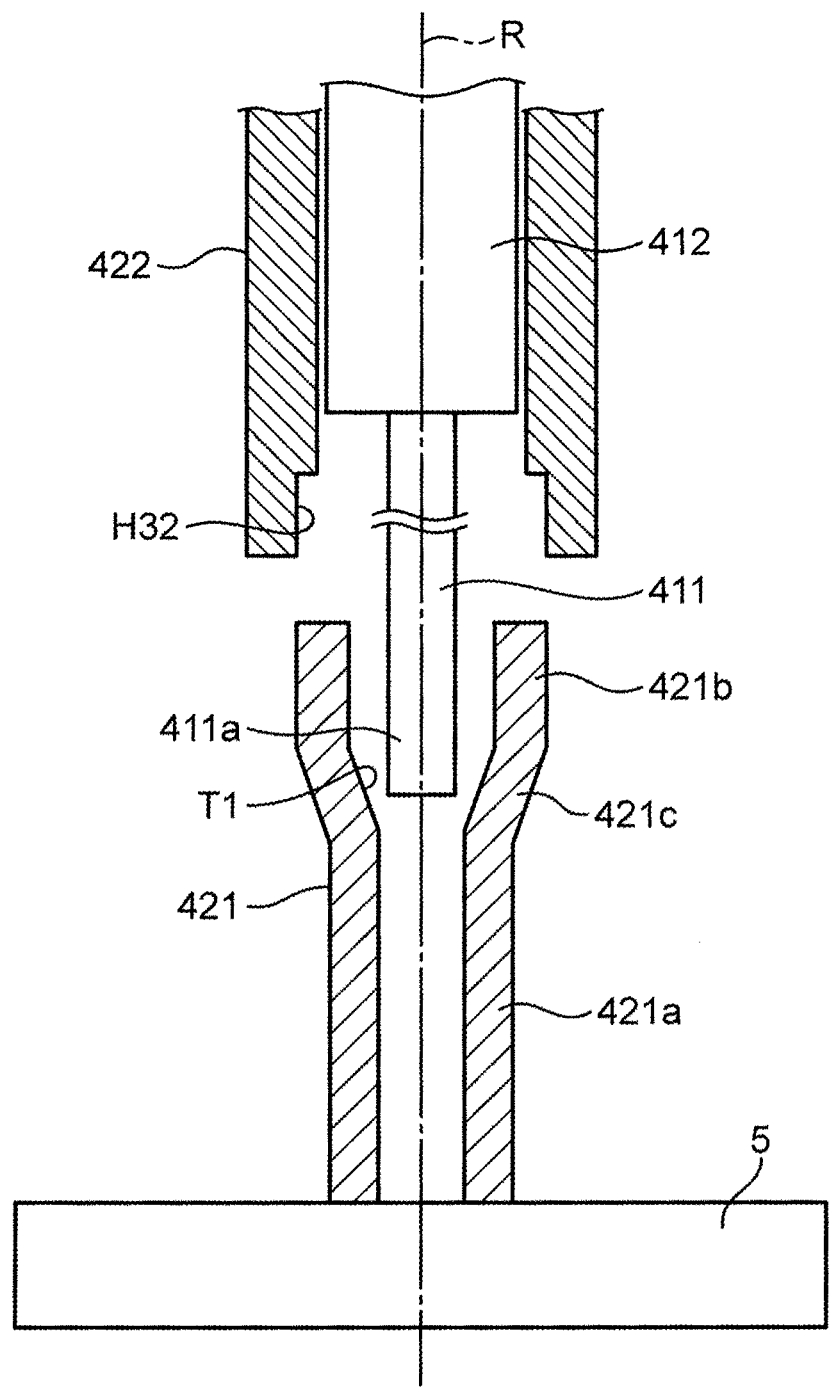
FIG. 19 is an illustration for explaining operation at replacement of a shoulder main body and corresponds to FIG. 13.

FIG. 19 illustrates a state of inserting, after detachment of the shoulder main body 421 from the shoulder adapter 422, the pin main body 411 in a new shoulder main body 421 for attachment of the new shoulder main body 421. In the second embodiment, an upper part 421*b* of the shoulder main body 421 has a relatively larger inner diameter as illustrated in the drawing. Thus, a lower part 411*a* of the pin main body 411 is easily insertable in the upper part 421*b*. The lower part 411*a* of the pin main body 411 comes into sliding contact with a tapered part T1 of the inner surface of the shoulder main body 421 in accordance with an increase in an insertion amount or lowering amount of the pin main body 411. In the sliding contact, a force to correct an insertion position of the pin main body 411 relative to the shoulder main body 421 acts, that is, a force to correct a relative position of the pin main body 411 on a plane perpendicularly intersecting an insertion direction (the up-down direction) into the shoulder main body 421 acts. The position of the shoulder main body 421 on the backing 5 is corrected with the correction force to make an axial center of the pin main body 411 align an axial center of the shoulder main body 421. A specific jig that positively permits displacement of the shoulder main body 421 on the backing 5 may be adopted for reliable correction of the position. Examples of the jig include a jig that supports the shoulder main body 421 in a slidable manner on the plane perpendicularly intersecting the insertion direction. The jig enables autonomous adjustment of the position of the shoulder main body 421 so that the axial center of the pin main body 411 aligns the axial center of the shoulder main body 421. Conclusively, the second embodiment in which the concentricity between the pin main body 411 and the shoulder main body 421 is autonomously ensured achieves improvement in an accuracy of determining a position of the shoulder main body 421 at replacement of the shoulder main body.

Here, the controller C desirably adjusts the insertion position of the pin main body 411 while measuring an axial load applied to the pin main body 411 to serve as a backup for disappointing working of the autonomous position adjustment described above, or a failure in insertion of the pin main body 411 attributed to abnormal tilting of the shoulder main body 421 or other factor. Specifically, the controller C specifies the axial load applied to the pin main body 411 at insertion of the pin main body 411 into the shoulder main body 421 on the basis of, for example, an output from the loadcell 45 (FIG. 2), and adjusts the insertion position of the pin main body 411 so that the specified axial load does not exceed a predefined value that is defined in advance. The adjustment consequently achieves reliable determination of the position of the pin main body 411 relative to the shoulder main body 421 and ensured high concentricity between these members while avoiding an excessive axial load.

Conclusion

The embodiments and the modifications described above cover the disclosure to be described below.

A friction stir welding device according to a first feature of the present disclosure includes: a pin extending along an axis; a shoulder having a cylindrical shape and coaxially surrounding an outer periphery of the pin; a driver that allows the pin and the shoulder to rotate about the axis and to advance and retract along the axis individually. The shoulder includes a shoulder main body having a distal end to be plunged into a welding target, and a shoulder adapter having a fit hole in which a proximal end of the shoulder main body is shrink-fitted and connecting the shoulder main body and the driver to each other.

In the first feature, the shoulder main body is joined to the shoulder adapter through shrink-fitting. The shoulder main body and the shoulder adapter are hence respectively made of suitable materials to meet their respective demand characteristics. Specifically, the shoulder main body to be directly plunged into the welding target may be made of cemented carbide having high abrasion resistance. The shoulder adapter to hold the shoulder main body may be made of steel having lower hardness than the material for the shoulder main body and being available at a lower cost than the cost for the material for the shoulder main body. The configuration attains a lower total component cost for the shoulder than a configuration including, for example, a shoulder main body and a shoulder adapter integrally made of cemented carbide.

Further, replacement of only the shoulder main body is attained while the shoulder adapter is kept used in concern about deterioration of the shoulder main body due to continuous use thereof, and thus, the configuration has an advantage in improvement in the maintainability. Specifically, the shoulder main body is joined to the shoulder adapter through shrink-fitting. Heating the shoulder adapter in this state to thermal expand results in releasing the shrink-fitting and thus detaching the shoulder main body from the shoulder adapter. Then, a new shoulder main body is inserted in the fit hole of the thermally expanded shoulder adapter, and thereafter, the shoulder adapter is cooled to shrink. The shrinking allows the new shoulder main body to be fixedly attached to the shoulder adapter. In this manner, the first feature in which replacement of only the shoulder main body is attained while the shoulder adapter is kept used achieves saving of the component replacement cost and improvement in the maintainability.

In the friction stir welding device according to the second feature, in the first feature, the shoulder adapter has a thermal expansion coefficient which is higher than a thermal expansion coefficient of the shoulder main body.

In the second feature, heating the shoulder adapter at the replacement of the shoulder main body allows the shoulder adapter to thermally expand more greatly than the shoulder main body. Such thermal expansion releases the shrink-fitting, so that the shoulder main body is detachable. Accordingly, the shoulder main body is easily and reliably replaceable with a new one.

In the friction stir welding device according to the third feature, in the second feature, the shoulder main body is made of cemented carbide and the shoulder adapter is made of tool steel.

The third feature achieves different thermal expansion coefficients as described above, and ensures sufficiently high abrasion resistance of the shoulder main body.

In the friction stir welding device according to the fourth feature, in the first to third features, the proximal end of the shoulder main body that is shrink-fitted to the shoulder adapter has an outer diameter which is not larger than an outer diameter of the distal end to be plunged into the welding target.

The fourth feature enables facilitated replacement of the shoulder main body.

In the friction stir welding device according to the fifth feature, in the first to third features, the proximal end of the shoulder main body that is shrink-fitted to the shoulder adapter has an inner diameter and an outer diameter which are larger than an inner diameter and an outer diameter of the distal end to be plunged into the welding target, and the shoulder main body has an inner surface having a tapered part with an inner diameter decreasing as advancing toward a leading end thereof.

The fifth feature in which the proximal end of the shoulder main body has a relatively larger diameter ensures sufficiently high attachment stiffness of the shoulder main body. Such a configuration facilitates, after detachment of the shoulder main body from the shoulder adapter, insertion of the pin in a new shoulder main body for attachment of the new shoulder main body. Besides, the tapered part of the inner surface of the shoulder main body acts to correct an insertion position of the pin into the shoulder main body. This consequently ensures the high concentricity between the pin and the shoulder main body and thus achieves improvement in an accuracy of determining a position of the shoulder main body at replacement of the shoulder main body.

The friction stir welding device according to the sixth feature, in the first to third features, further includes a clamp having a cylindrical shape and coaxially surrounding an outer periphery of the shoulder. The clamp includes a clamp main body to come into contact with the welding target, and a clamp adapter to which a proximal end of the clamp main body is connected. The shoulder main body has a maximum outer diameter which is smaller than a minimum inner diameter of the clamp main body.

In the sixth feature, the shoulder main body is attachable to and detachable from the shoulder adapter while the clamp main body is kept joined to the clamp adapter. This achieves independent and facilitated replacement of only the shoulder main body and improvement in the maintainability of the rotary tool.

In the friction stir welding device according to the seventh feature, in the first to sixth features, the pin includes a pin main body having a distal end to be plunged into the welding target, and a pin adapter having a fit hole in which a proximal end of the pin main body is shrink-fitted and connecting the pin main body and the driver to each other.

In the seventh feature, a suitable material to meet the demand characteristics for each of the pin main body and the pin adapter is selectable, and replacement of only the pin main body is attained at maintenance. This achieves saving of the component cost and the maintenance cost.

A maintenance method according to an eighth feature of the present disclosure is a maintenance method for replacement of the shoulder main body in the friction stir welding device according to the first to seventh features described above. The maintenance method includes: heating the shoulder adapter to increase a diameter of the fit hole of the shoulder adapter and detaching the shoulder adapter from the shoulder main body; inserting a proximal end of a new shoulder main body in the fit hole of the heated shoulder adapter; and cooling the shoulder adapter to decrease the increased diameter of the fit hole of the shoulder adapter and fixedly attaching the new shoulder main body to the shoulder adapter.

The method enables facilitated and reliable replacement of the shoulder main body.

In the friction stir welding method according to the ninth feature, in the eighth feature, in the inserting of the proximal end of the new shoulder main body, the shoulder adapter and the pin are made approach the new shoulder main body facing the shoulder adapter in the axial direction so that the distal end of the pin is inserted in the new shoulder main body and the proximal end of the new shoulder main body is inserted in the fit hole of the shoulder adapter.

This achieves ensured high concentricity between the shoulder main body and the shoulder adapter, and reliable insertion of the shoulder main body in the shoulder adapter.

In the friction stir welding method according to the tenth feature, in the ninth feature, the new shoulder main body has an inner surface having a tapered part with an inner diameter decreasing as advancing toward a leading end. In the inserting of the proximal end of the new shoulder main body, the pin is inserted in the new shoulder main body while an axial load being applied to the pin is measured.

This consequently ensures high concentricity between the shoulder main body and the pin while avoiding an excessive axial load in the insertion of the pin, and further achieves improvement in an accuracy of determining a position of the shoulder main body at replacement of the shoulder main body.

The invention claimed is:

1. A friction stir welding device, comprising:
   a pin extending along an axis;
   a shoulder having a cylindrical shape and coaxially surrounding an outer periphery of the pin;
   a driver that allows the pin and the shoulder to rotate about the axis and to advance and retract along the axis individually, wherein
   the shoulder includes a shoulder main body having a distal end to be plunged into a welding target, and a shoulder adapter having a fit hole in which a proximal end of the shoulder main body is shrink-fitted and connecting the shoulder main body and the driver to each other.

2. The friction stir welding device according to claim 1, wherein the shoulder adapter has a thermal expansion coefficient which is higher than a thermal expansion coefficient of the shoulder main body.

3. The friction stir welding device according to claim 2, wherein the shoulder main body is made of cemented carbide and the shoulder adapter is made of tool steel.

4. The friction stir welding device according to claim 1, wherein the proximal end of the shoulder main body that is shrink-fitted to the shoulder adapter has an outer diameter which is not larger than an outer diameter of the distal end to be plunged into the welding target.

5. The friction stir welding device according to claim 1, wherein the proximal end of the shoulder main body that is shrink-fitted to the shoulder adapter has an inner diameter and an outer diameter which are larger than an inner diameter and an outer diameter of the distal end to be plunged into the welding target, and
   the shoulder main body has an inner surface having a tapered part with an inner diameter decreasing as advancing toward a leading end thereof.

6. The friction stir welding device according to claim 1, further comprising:
   a clamp having a cylindrical shape and coaxially surrounding an outer periphery of the shoulder, wherein
   the clamp includes a clamp main body to come into contact with the welding target, and a clamp adapter to which a proximal end of the clamp main body is connected, and
   the shoulder main body has a maximum outer diameter which is smaller than a minimum inner diameter of the clamp main body.

7. The friction stir welding device according to claim 1, wherein the pin includes a pin main body having a distal end to be plunged into the welding target, and a pin adapter having a fit hole in which a proximal end of the pin main body is shrink-fitted and connecting the pin main body and the driver to each other.

8. A maintenance method for replacement of the shoulder main body in the friction stir welding device according to claim 1, the maintenance method comprising:
- heating the shoulder adapter to increase a diameter of the fit hole of the shoulder adapter and detaching the shoulder adapter from the shoulder main body;
- inserting a proximal end of a new shoulder main body in the fit hole of the heated shoulder adapter; and
- cooling the shoulder adapter to decrease the increased diameter of the fit hole of the shoulder adapter and fixedly attaching the new shoulder main body to the shoulder adapter.

9. The maintenance method for the friction stir welding device according to claim 8, wherein,
- in the inserting of the proximal end of the new shoulder main body, the shoulder adapter and the pin are made to approach the new shoulder main body facing the shoulder adapter in the axial direction so that the distal end of the pin is inserted in the new shoulder main body and the proximal end of the new shoulder main body is inserted in the fit hole of the shoulder adapter.

10. The maintenance method for the friction stir welding device according to claim 9, wherein the new shoulder main body has an inner surface having a tapered part with an inner diameter decreasing as advancing toward a leading end thereof, and,
- in the inserting of the proximal end of the new shoulder main body, the pin is inserted in the new shoulder main body while an axial load applied to the pin is measured.

* * * * *